US012614952B2

(12) United States Patent
Bartos et al.

(10) Patent No.: US 12,614,952 B2
(45) Date of Patent: Apr. 28, 2026

(54) ELECTRIC ROTATING MACHINE WITH MEANS FOR DRAINING COOLING FLUID FROM A ROTOR COMPARTMENT

(71) Applicant: Traton AB, Södertälje (SE)

(72) Inventors: Elias Bartos, Huddinge (SE); Ove Sponton, Västerljung (SE); Håkan Settersjö, Huddinge (SE); Usman Afridi, Södertälje (SE)

(73) Assignee: Traton AB, Södertälje (SE)

( * ) Notice: Subject to any disclaimer, the term of this patent is extended or adjusted under 35 U.S.C. 154(b) by 238 days.

(21) Appl. No.: 18/278,533

(22) PCT Filed: Mar. 28, 2022

(86) PCT No.: PCT/SE2022/050295
§ 371 (c)(1),
(2) Date: Aug. 23, 2023

(87) PCT Pub. No.: WO2022/231496
PCT Pub. Date: Nov. 3, 2022

(65) Prior Publication Data
US 2024/0055953 A1    Feb. 15, 2024

(30) Foreign Application Priority Data

Apr. 28, 2021    (SE) ..................................... 2150535-9

(51) Int. Cl.
*H02K 9/19*            (2006.01)
*H02K 1/2706*        (2022.01)
(Continued)

(52) U.S. Cl.
CPC .............. *H02K 9/19* (2013.01); *H02K 9/193* (2013.01); *H02K 1/2706* (2013.01); *H02K 5/203* (2021.01); *H02K 7/006* (2013.01)

(58) Field of Classification Search
CPC .. H02K 9/19; H02K 1/32; H02K 3/24; H02K 7/006; H02K 1/2706; H02K 9/193; H02K 5/203
(Continued)

(56) References Cited

U.S. PATENT DOCUMENTS 3,648,085 A    3/1972  Fujii
5,519,269 A    5/1996  Lindberg
(Continued)

FOREIGN PATENT DOCUMENTS

CN    111969755 A  *  11/2020  ............... H02K 9/06
CN    112018940 A  *  12/2020  ............... B60K 1/00
(Continued)

OTHER PUBLICATIONS

Scania CV AB, International Patent Application No. PCT/SE2022/050295, International Preliminary Report on Patentability, Oct. 24, 2023.
(Continued)

*Primary Examiner* — Oluseye Iwarere
*Assistant Examiner* — Daniel K Schlak
(74) *Attorney, Agent, or Firm* — Moore & Van Allen PLLC; W. Kevin Ransom

(57) ABSTRACT

An electric rotating machine comprising a stator, a rotor rotatable about an axis of rotation in relation to the stator, a rotor compartment holding the rotor, a fluid system for cooling one or more of the rotor and stator and a fluid-guiding member having a front and a back. The front of the fluid-guiding member faces the rotor compartment while the back of the fluid-guiding member faces away from the rotor compartment. The fluid-guiding member comprises a guide for guiding a fluid. The guide extends from the front of the fluid-guiding member toward the back of the fluid-guiding member. The guide is configured to guide a fluid from the
(Continued)

front of the fluid-guiding member to the back of the fluid-guiding member upon rotation of the rotor to remove a fluid from the rotor compartment.

23 Claims, 20 Drawing Sheets

(51) Int. Cl.
| | |
|---|---|
| *H02K 9/193* | (2006.01) |
| *H02K 5/20* | (2006.01) |
| *H02K 7/00* | (2006.01) |

(58) Field of Classification Search
USPC .......................................................... 310/54
See application file for complete search history.

(56) References Cited

U.S. PATENT DOCUMENTS

| | | | | |
|---|---|---|---|---|
| 7,397,154 | B2 * | 7/2008 | Tilton ...................... | H02K 5/18 |
| | | | | 310/64 |
| 9,742,242 | B2 * | 8/2017 | Watanabe .............. | H02K 5/207 |
| 2003/0222520 | A1 * | 12/2003 | Yokota ................. | H02K 21/222 |
| | | | | 310/63 |
| 2004/0164628 | A1 * | 8/2004 | Serizawa ................. | H02K 1/32 |
| | | | | 310/61 |
| 2010/0237725 | A1 * | 9/2010 | Tatematsu ................. | B60L 7/14 |
| | | | | 310/61 |
| 2011/0309698 | A1 * | 12/2011 | Kirkley, Jr. .............. | H02K 3/24 |
| | | | | 310/54 |
| 2013/0151057 | A1 * | 6/2013 | Matsubara ............. | B60K 6/547 |
| | | | | 180/65.265 |
| 2015/0069865 | A1 | 3/2015 | Alfermann et al. | |
| 2015/0280522 | A1 * | 10/2015 | Austin ...................... | H02K 9/19 |
| | | | | 310/54 |
| 2016/0013704 | A1 | 1/2016 | Wagner et al. | |
| 2016/0172937 | A1 | 6/2016 | Pal | |
| 2016/0218595 | A1 * | 7/2016 | Maekawa ................. | H02K 9/19 |
| 2017/0012501 | A1 * | 1/2017 | Sano ........................ | H02K 9/19 |
| 2017/0310190 | A1 * | 10/2017 | Degner .................... | H02K 9/19 |
| 2018/0219455 | A1 * | 8/2018 | Goldstein ............. | H02K 7/006 |
| 2018/0278126 | A1 | 9/2018 | Goldstein et al. | |
| 2019/0115805 | A1 * | 4/2019 | Do ........................... | H02K 9/19 |
| 2019/0319505 | A1 * | 10/2019 | Degner .................... | H02K 1/30 |
| 2020/0036248 | A1 * | 1/2020 | Krais ....................... | H02K 1/30 |
| 2020/0127536 | A1 * | 4/2020 | Miyazono ............ | H02K 11/225 |
| 2020/0204021 | A1 * | 6/2020 | Kim .......................... | H02K 9/19 |
| 2020/0220432 | A1 | 7/2020 | Chernogorski | |
| 2020/0227978 | A1 * | 7/2020 | Yamaguchi .............. | H02K 1/32 |
| 2020/0295628 | A1 * | 9/2020 | Reichert ............... | H02K 5/203 |
| 2020/0366147 | A1 | 11/2020 | Krais et al. | |
| 2020/0381968 | A1 * | 12/2020 | Wakui ...................... | H02K 1/32 |
| 2020/0403473 | A1 * | 12/2020 | Degner ................... | B60K 6/26 |
| 2021/0057948 | A1 * | 2/2021 | Kuhl ........................ | H02K 9/19 |
| 2021/0218302 | A1 * | 7/2021 | Larson ..................... | H02K 3/24 |
| 2021/0242746 | A1 * | 8/2021 | Radl ........................ | H02K 9/19 |
| 2023/0261542 | A1 * | 8/2023 | Yamaguchi ......... | F16H 57/0421 |
| | | | | 310/54 |
| 2025/0007344 | A1 * | 1/2025 | Klein ....................... | H02K 1/06 |

FOREIGN PATENT DOCUMENTS

| | | | | |
|---|---|---|---|---|
| EP | 2584675 | A2 | 4/2013 | |
| EP | 3331134 | A1 | 6/2018 | |
| JP | 2010045894 | A * | 2/2010 | .............. H02K 1/32 |
| JP | 2010252544 | A | 11/2010 | |
| KR | 20170057054 | A * | 5/2017 | .............. H02K 1/20 |

OTHER PUBLICATIONS

Scania CV AB, International Patent Application No. PCT/SE2022/050295, International Search Report, May 19, 2022.
Scania CV AB, International Patent Application No. PCT/SE2022/050295, Written Opinion, May 19, 2022.
Scania CV AB, Swedish Patent Application No. 2150535-9, Office Action, Dec. 16, 2021.
Scania CV AB, Swedish Patent Application No. 2150535-9, Office Action, Mar. 16, 2023.
Scania CV AB, European Patent Application No. 22796268.5, Extended European Search Report, Feb. 28, 2025.

* cited by examiner

E-E

ELECTRIC ROTATING MACHINE WITH MEANS FOR DRAINING COOLING FLUID FROM A ROTOR COMPARTMENT

CROSS-REFERENCE TO RELATED APPLICATIONS

This application is a National Stage Patent Application (filed under 35 § U.S.C. 371) of PCT/SE2022/050295, filed Mar. 28, 2022, of the same title, which, in turn claims priority to Swedish Patent Application No. 2150535-9 filed Apr. 28, 2021, of the same title; the contents of each of which are hereby incorporated by reference.

TECHNICAL FIELD

Aspects of the present invention relate to an electric rotating machine comprising a stator and a rotor rotatable about an axis of rotation in relation to the stator.

BACKGROUND

In general, an electric rotating machine comprises a stator and a rotor rotatable about an axis of rotation in relation to the stator. In general, at least one of the rotor and stator may be provided with one or more windings. Some electric rotating machines are equipped with a fluid system for cooling one or more of the rotor and stator, since during operation of the electric rotating machine one or more of the rotor and stator may be heated to such a degree that cooling is advisable. The fluid system may guide an oil, or any other fluid, in channels to cool one or more of the rotor and stator.

SUMMARY

The inventors of the present invention have found drawbacks in conventional solutions for cooling one or more of the rotor and stator. For example, the inventors of the present invention have found that some conventional cooling systems are not efficient enough. The inventors of the present invention have found that for some conventional fluid cooling systems, some of the cooling fluid may end up in the rotor compartment holding the rotor. Cooling fluid present in the rotor compartment and around the rotor may impair the operation of the electric rotating machine, for example by creating drag losses.

An object of the invention is to provide a solution which mitigates or solves the drawbacks and problems of conventional solutions.

The above and further objects are solved by the subject matter of the independent claims. Further advantageous embodiments of the invention can be found in the dependent claims.

According to a first aspect of the invention, the above mentioned and other objects are achieved with an electric rotating machine comprising a stator, a rotor rotatable about an axis of rotation in relation to the stator, a rotor compartment holding the rotor, a fluid system for cooling one or more of the rotor and stator, and a fluid-guiding member having a front and a back, wherein the front of the fluid-guiding member faces the rotor compartment while the back of the fluid-guiding member faces away from the rotor compartment, wherein the fluid-guiding member comprises a guide for guiding a fluid, wherein the guide extends from the front of the fluid-guiding member toward the back of the fluid-guiding member, and wherein the guide is configured to guide a fluid from the front of the fluid-guiding member to the back of the fluid-guiding member upon rotation of the rotor to remove a fluid from the rotor compartment.

An advantage of the electric rotating machine according to the first aspect is that cooling fluid present in the rotor compartment and around the rotor and originating from a fluid system for cooling one or more of the rotor and stator is efficiently removed and drained from the rotor compartment. An advantage of the electric rotating machine according to the first aspect is that the cooling of one or more of the rotor and stator is improved and made more efficient. An advantage of the electric rotating machine according to the first aspect is that a more efficient fluid cooling system for cooling one or more of the rotor and stator is provided. An advantage of the electric rotating machine according to the first aspect is that the operation of an electric rotating machine having a fluid system for cooling one or more of the rotor and stator is improved and made more efficient. An advantage of the electric rotating machine according to the first aspect is that an efficient electric rotating machine having a fluid cooling system is provided. For example, an advantage of the electric rotating machine according to the first aspect is an efficient reduction of drag losses, since fluid is efficiently removed from the rotor compartment, which otherwise would cause or increase drag losses. An advantage of the electric rotating machine according to the first aspect is that the rotor may be free of any means, for example channels or patterns, for guiding a fluid, since the guidance of fluid away from the rotor compartment is taken care of by the fluid-guiding member, whereby the outer surface of the rotor may be smooth, and therefore, drag losses may be further reduced. The innovative fluid-guiding member and guide may be described to use the dynamic forces created upon the rotation of the rotor to guide a fluid away from the rotor compartment. For example, the innovative fluid-guiding member and guide need not to rely on the influence of gravity on the fluid to remove fluid from the rotor compartment. Thereby, an efficient removal of fluid from the rotor compartment can be efficiently effected independently of any tilting or angle of the electric rotating machine, for example, regardless of if a vehicle carrying the electric rotating machine is standing on a sloping surface, for example downhill or uphill. The fluid-guiding member may be disclosed to be immovable in relation to the stator. The guide may be disclosed to be immovable in relation to the stator. The rotor may be described to be rotatable about the axis of rotation in relation to the fluid-guiding member. The rotor may be described to be rotatable about the axis of rotation in relation to the guide. The fluid may comprise or consist of one or more of the group of: a liquid; a gas; and a gas mixture. The liquid may comprise or consist of an oil or an oil mixture.

According to an advantageous embodiment of the electric rotating machine according to the first aspect, the front of the fluid-guiding member faces the rotor compartment in the direction of the axis of rotation while the back of the fluid-guiding member faces away from the rotor compartment in the direction of the axis of rotation. An advantage of this embodiment is that the removal of cooling fluid present in the rotor compartment is further improved. An advantage of this embodiment is that the cooling of one or more of the rotor and stator is further improved. An advantage of this embodiment is that the operation of an electric rotating machine having a fluid system for cooling one or more of the rotor and stator is further improved.

According to a further advantageous embodiment of the electric rotating machine according to the first aspect, the electric rotating machine comprises a gable unit immovable in relation to the stator, wherein the back of the fluid-guiding member faces the gable unit, and wherein the front of the fluid-guiding member faces away from the gable unit.

The gable unit may also be referred to as an end unit, for example an end unit of a housing which houses the rotor and stator. An advantage of this embodiment is that the removal of fluid present in the rotor compartment is further improved. An advantage of this embodiment is that the cooling of one or more of the rotor and stator is further improved. An advantage of this embodiment is that the operation of an electric rotating machine having a fluid system for cooling one or more of the rotor and stator is further improved.

According to another advantageous embodiment of the electric rotating machine according to the first aspect, a drain space is formed between the gable unit and the back of the fluid-guiding member, wherein the drain space is configured to drain a fluid away from the guide.

An advantage of this embodiment is that fluid is efficiently removed from the back of the fluid-guiding member and conveyed further away from the rotor compartment, for example to a fluid collector, a fluid collecting tray or vessel, or a fluid sump. An advantage of this embodiment is that the cooling of one or more of the rotor and stator is further improved. An advantage of this embodiment is that the operation of an electric rotating machine having a fluid system for cooling one or more of the rotor and stator is further improved.

According to still another advantageous embodiment of the electric rotating machine according to the first aspect, the fluid-guiding member is located between the gable unit and the rotor. An advantage of this embodiment is that the removal of fluid present in the rotor compartment is further improved. An advantage of this embodiment is that the cooling of one or more of the rotor and stator is further improved. An advantage of this embodiment is that the operation of an electric rotating machine having a fluid system for cooling one or more of the rotor and stator is further improved. For some embodiments, the fluid-guiding member may be attached, or attachable, to the gable unit.

According to yet another advantageous embodiment of the electric rotating machine according to the first aspect, the guide extends from the front of the fluid-guiding member to the back of the fluid-guiding member. An advantage of this embodiment is that the removal of fluid present in the rotor compartment is further improved. An advantage of this embodiment is that the cooling of one or more of the rotor and stator is further improved. An advantage of this embodiment is that the operation of an electric rotating machine having a fluid system for cooling one or more of the rotor and stator is further improved.

According to a further advantageous embodiment of the electric rotating machine according to the first aspect, the guide comprises one or more sloping surfaces for guiding a fluid. The sloping surface may be described to be sloping in relation to the axis of rotation. An advantage of this embodiment is that the removal of fluid present in the rotor compartment is further improved. An advantage of this embodiment is that the cooling of one or more of the rotor and stator is further improved. An advantage of this embodiment is that the operation of an electric rotating machine having a fluid system for cooling one or more of the rotor and stator is further improved.

According to another advantageous embodiment of the electric rotating machine according to the first aspect, the guide is configured to guide a fluid from the front of the fluid-guiding member to the back of the fluid-guiding member on the one or more sloping surfaces upon rotation of the rotor to remove a fluid from the rotor compartment. An advantage of this embodiment is that the removal of fluid present in the rotor compartment is further improved. An advantage of this embodiment is that the cooling of one or more of the rotor and stator is further improved. An advantage of this embodiment is that the operation of an electric rotating machine having a fluid system for cooling one or more of the rotor and stator is further improved.

According to yet another advantageous embodiment of the electric rotating machine according to the first aspect, the sloping surface extends from the front of the fluid-guiding member toward the back of the fluid-guiding member. An advantage of this embodiment is that the removal of fluid present in the rotor compartment is further improved. An advantage of this embodiment is that the cooling of one or more of the rotor and stator is further improved. An advantage of this embodiment is that the operation of an electric rotating machine having a fluid system for cooling one or more of the rotor and stator is further improved.

According to still another advantageous embodiment of the electric rotating machine according to the first aspect, the sloping surface extends to the back of the fluid-guiding member. An advantage of this embodiment is that the removal of fluid present in the rotor compartment is further improved. An advantage of this embodiment is that the cooling of one or more of the rotor and stator is further improved. An advantage of this embodiment is that the operation of an electric rotating machine having a fluid system for cooling one or more of the rotor and stator is further improved.

According to an advantageous embodiment of the electric rotating machine according to the first aspect, one or more of the one or more sloping surfaces is/are concave. An advantage of this embodiment is that the removal of fluid present in the rotor compartment is further improved. An advantage of this embodiment is that the cooling of one or more of the rotor and stator is further improved. An advantage of this embodiment is that the operation of an electric rotating machine having a fluid system for cooling one or more of the rotor and stator is further improved. The concavity of the sloping surface provides for an efficient receipt and guidance of the fluid along or on the sloping surface.

According to a further advantageous embodiment of the electric rotating machine according to the first aspect, the guide comprises two opposing sloping surfaces. An advantage of this embodiment is that the removal of fluid present in the rotor compartment is further improved. An advantage of this embodiment is that the cooling of one or more of the rotor and stator is further improved. An advantage of this embodiment is that the operation of an electric rotating machine having a fluid system for cooling one or more of the rotor and stator is further improved. By having two opposing sloping surfaces, fluid may be efficiently guided away from the rotor compartment irrespective of the direction of rotation of the rotor.

According to another advantageous embodiment of the electric rotating machine according to the first aspect, the two opposing sloping surfaces are opposite one another in the direction of rotation of the rotor. An advantage of this embodiment is that the removal of fluid present in the rotor compartment is further improved. An advantage of this embodiment is that the cooling of one or more of the rotor and stator is further improved. An advantage of this embodiment is that the operation of an electric rotating machine having a fluid system for cooling one or more of the rotor and stator is further improved. By having two opposing sloping surfaces opposite one another in the direction of rotation of the rotor, fluid may be efficiently guided away from the rotor compartment irrespective of the direction of rotation of the rotor.

According to yet another advantageous embodiment of the electric rotating machine according to the first aspect, the guide comprises an apex pointing in the direction toward the back of the fluid-guiding member, wherein the two opposing sloping surfaces are joined in the apex.

An advantage of this embodiment is that the removal of fluid present in the rotor compartment is further improved. An advantage of this embodiment is that the cooling of one or more of the rotor and stator is further improved. An advantage of this embodiment is that the operation of an electric rotating machine having a fluid system for cooling one or more of the rotor and stator is further improved.

According to still another advantageous embodiment of the electric rotating machine according to the first aspect, the apex extends to the back of the fluid-guiding member. An advantage of this embodiment is that the removal of fluid present in the rotor compartment is further improved. An advantage of this embodiment is that the cooling of one or more of the rotor and stator is further improved. An advantage of this embodiment is that the operation of an electric rotating machine having a fluid system for cooling one or more of the rotor and stator is further improved.

According to an advantageous embodiment of the electric rotating machine according to the first aspect, the fluid-guiding member has a periphery surrounding the axis of rotation, wherein the guide adjoins the periphery of the fluid-guiding member at the front of the fluid-guiding member.

An advantage of this embodiment is that the removal of fluid present in the rotor compartment is further improved. An advantage of this embodiment is that the cooling of one or more of the rotor and stator is further improved. An advantage of this embodiment is that the operation of an electric rotating machine having a fluid system for cooling one or more of the rotor and stator is further improved. By having the guide adjoining the periphery of the fluid-guiding member, a fluid may be efficiently collected from the periphery by the guide and further guided on or along the guide to the back of the fluid-guiding member.

According to a further advantageous embodiment of the electric rotating machine according to the first aspect, the fluid-guiding member forms a peripheral opening between the front of the fluid-guiding member and the back of the fluid-guiding member, wherein the guide enters the peripheral opening.

An advantage of this embodiment is that the removal of fluid present in the rotor compartment is further improved. An advantage of this embodiment is that the cooling of one or more of the rotor and stator is further improved. An advantage of this embodiment is that the operation of an electric rotating machine having a fluid system for cooling one or more of the rotor and stator is further improved.

According to another advantageous embodiment of the electric rotating machine according to the first aspect, the guide extends from the front of the fluid-guiding member to the back of the fluid-guiding member via the peripheral opening. An advantage of this embodiment is that the removal of fluid present in the rotor compartment is further improved. An advantage of this embodiment is that the cooling of one or more of the rotor and stator is further improved. An advantage of this embodiment is that the operation of an electric rotating machine having a fluid system for cooling one or more of the rotor and stator is further improved.

According to yet another advantageous embodiment of the electric rotating machine according to the first aspect, the periphery of the fluid-guiding member is annular. An advantage of this embodiment is that fluid may be efficiently collected and guided by the periphery of the fluid-guiding member. An advantage of this embodiment is that the removal of fluid present in the rotor compartment is further improved. An advantage of this embodiment is that the cooling of one or more of the rotor and stator is further improved. An advantage of this embodiment is that the operation of an electric rotating machine having a fluid system for cooling one or more of the rotor and stator is further improved.

According to still another advantageous embodiment of the electric rotating machine according to the first aspect, the periphery of the fluid-guiding member is circular. An advantage of this embodiment is that fluid may be efficiently collected and guided by the periphery of the fluid-guiding member. An advantage of this embodiment is that the removal of fluid present in the rotor compartment is further improved. An advantage of this embodiment is that the cooling of one or more of the rotor and stator is further improved. An advantage of this embodiment is that the operation of an electric rotating machine having a fluid system for cooling one or more of the rotor and stator is further improved.

According to an advantageous embodiment of the electric rotating machine according to the first aspect, the periphery of the fluid-guiding member comprises a peripheral path at the front of the fluid-guiding member, wherein the peripheral path is configured to guide a fluid upon rotation of the rotor.

An advantage of this embodiment is that fluid may be efficiently collected and guided by the periphery of the fluid-guiding member. An advantage of this embodiment is that the removal of fluid present in the rotor compartment is further improved. An advantage of this embodiment is that the cooling of one or more of the rotor and stator is further improved. An advantage of this embodiment is that the operation of an electric rotating machine having a fluid system for cooling one or more of the rotor and stator is further improved.

According to a further advantageous embodiment of the electric rotating machine according to the first aspect, the guide adjoins the peripheral path. By having the guide adjoining the peripheral path of the fluid-guiding member, a fluid may be efficiently collected from the peripheral path by the guide and further guided on or along the guide to the back of the fluid-guiding member. An advantage of this embodiment is that the removal of fluid present in the rotor compartment is further improved. An advantage of this embodiment is that the cooling of one or more of the rotor and stator is further improved. An advantage of this embodiment is that the operation of an electric rotating machine having a fluid system for cooling one or more of the rotor and stator is further improved.

According to another advantageous embodiment of the electric rotating machine according to the first aspect, the periphery of the fluid-guiding member comprises a wall at the front of the fluid-guiding member, wherein the wall comprises an inner surface facing the axis of the rotation, and wherein the inner surface of the wall is configured to receive a fluid upon rotation of the rotor.

By said wall and its inner surface, a fluid leaving the rotor and travelling in an outward radial direction upon rotation of the rotor may be efficiently collected and further guided on or along the guide to the back of the fluid-guiding member. An advantage of this embodiment is that the removal of fluid present in the rotor compartment is further improved. An advantage of this embodiment is that the cooling of one or more of the rotor and stator is further improved. An advantage of this embodiment is that the operation of an electric rotating machine having a fluid system for cooling one or more of the rotor and stator is further improved.

According to yet another advantageous embodiment of the electric rotating machine according to the first aspect, the inner surface of the wall is annular. An advantage of this embodiment is that a fluid leaving the rotor and travelling in an outward radial direction upon rotation of the rotor may be efficiently collected and guided by the inner surface of the wall. An advantage of this embodiment is that the removal of fluid present in the rotor compartment is further improved. An advantage of this embodiment is that the cooling of one or more of the rotor and stator is further improved. An advantage of this embodiment is that the operation of an electric rotating machine having a fluid system for cooling one or more of the rotor and stator is further improved.

According to still another advantageous embodiment of the electric rotating machine according to the first aspect, the inner surface of the wall is circular. An advantage of this embodiment is that a fluid leaving the rotor and travelling in an outward radial direction upon rotation of the rotor may be efficiently collected and guided by the inner surface of the wall. An advantage of this embodiment is that the removal of fluid present in the rotor compartment is further improved. An advantage of this embodiment is that the cooling of one or more of the rotor and stator is further improved. An advantage of this embodiment is that the operation of an electric rotating machine having a fluid system for cooling one or more of the rotor and stator is further improved.

According to an advantageous embodiment of the electric rotating machine according to the first aspect, the inner surface of the wall is provided with the peripheral path. An advantage of this embodiment is that the removal of fluid present in the rotor compartment is further improved. An advantage of this embodiment is that the cooling of one or more of the rotor and stator is further improved. An advantage of this embodiment is that the operation of an electric rotating machine having a fluid system for cooling one or more of the rotor and stator is further improved.

According to a further advantageous embodiment of the electric rotating machine according to the first aspect, the guide comprises one or more ramps, wherein at the front of the fluid-guiding member the periphery of the fluid-guiding member and each one of one or more of the one or more sloping surfaces are joined via the one or more ramps.

An advantage of this embodiment is that fluid may be efficiently collected and guided to the sloping surface. An advantage of this embodiment is that the removal of fluid present in the rotor compartment is further improved. An advantage of this embodiment is that the cooling of one or more of the rotor and stator is further improved. An advantage of this embodiment is that the operation of an electric rotating machine having a fluid system for cooling one or more of the rotor and stator is further improved. The ramp may be described to collect a fluid and guide a fluid to the sloping surface.

According to another advantageous embodiment of the electric rotating machine according to the first aspect, the ramp is configured to guide a fluid from the periphery of the fluid-guiding member at the front of the fluid-guiding member to one of the one or more sloping surfaces upon rotation of the rotor. An advantage of this embodiment is that the removal of fluid present in the rotor compartment is further improved. An advantage of this embodiment is that the cooling of one or more of the rotor and stator is further improved. An advantage of this embodiment is that the operation of an electric rotating machine having a fluid system for cooling one or more of the rotor and stator is further improved. The ramp may be described to collect a fluid and guide a fluid to the sloping surface. For some embodiments, it may be defined that the ramp is configured to lift, or elevate, a fluid from the periphery of the fluid-guiding member at the front of the fluid-guiding member to one of the one or more sloping surfaces upon rotation of the rotor.

According to yet another advantageous embodiment of the electric rotating machine according to the first aspect, the electric rotating machine comprises a shaft rotatable about the axis of rotation in relation to the stator, wherein the shaft is rotatable with the rotor, wherein the fluid-guiding member forms a central opening, and wherein the shaft extends through the central opening.

An advantage of this embodiment is that the removal of fluid present in the rotor compartment is further improved. An advantage of this embodiment is that the cooling of one or more of the rotor and stator is further improved. An advantage of this embodiment is that the operation of an electric rotating machine having a fluid system for cooling one or more of the rotor and stator is further improved. An advantage of this embodiment is that the fluid-guiding member may be efficiently mounted to the electric rotating machine and/or to the gable unit. An advantage of this embodiment is that the fluid-guiding member may be efficiently oriented and positioned in relation to the rotor and/or the gable unit.

According to a second aspect of the invention, the above mentioned and other objects are achieved with a method for removing a fluid from a rotor compartment holding a rotor of an electric rotating machine having a stator, wherein the fluid originates from a fluid system for cooling one or more of the rotor and stator, wherein the electric rotating machine comprises the stator, the rotor rotatable about an axis of rotation in relation to the stator, the rotor compartment, the fluid system, and a fluid-guiding member having a front and a back, wherein the front of the fluid-guiding member faces the rotor compartment while the back of the fluid-guiding member faces away from the rotor compartment, wherein the fluid-guiding member comprises a guide for guiding a fluid, and wherein the guide extends from the front of the fluid-guiding member toward the back of the fluid-guiding member, wherein the method comprises:

guiding a fluid from the front of the fluid-guiding member to the back of the fluid-guiding member by way of the guide and upon rotation of the rotor to remove a fluid from the rotor compartment.

Advantages of the method according to the second aspect correspond to the above- or below-mentioned advantages of the electric rotating machine according to the first aspect and its embodiments.

According to a third aspect of the invention, the above mentioned and other objects are achieved with a vehicle comprising one or more electric rotating machines according to any one of the embodiments disclosed above or below.

Advantages of the vehicle according to the third aspect and its embodiments correspond to the above- or below-mentioned advantages of the electric rotating machine according to the first aspect and its embodiments.

The vehicle may be a wheeled vehicle, i.e. a vehicle having wheels. The vehicle may 2 for example be a bus, a tractor vehicle, a heavy vehicle, a truck, or a car. The tractor vehicle, and/or the truck, may, or may be configured to, haul, or pull, a trailer. However, other types of vehicles are possible. The vehicle may be referred to as a motor vehicle. The vehicle may be an electric vehicle, EV, for example a hybrid vehicle or a hybrid electric vehicle, HEV, or a battery electric vehicle, BEV. Thus, a hybrid electric vehicle, HEV, and a battery electric vehicle, BEV, are versions, or examples, of an electric vehicle, EV. The EV may comprise one or more electric motors or electrical machines. The vehicle may comprise a combustion engine. For some embodiments, the vehicle may include only a combustion engine for the propulsion of the vehicle.

The vehicle may comprise a powertrain. The powertrain may be configured in accordance with any one of the embodiments disclosed above or below. The powertrain of the vehicle may comprise one or more of the group of: a combustion engine; an electric battery cell unit; an electric battery arrangement; and an electric battery pack.

The above-mentioned features and embodiments of the electric rotating machine, the method and the vehicle, respectively, may be combined in various possible ways providing further advantageous embodiments.

Further advantageous embodiments of the electric rotating machine, the method and the vehicle according to the present invention and further advantages with the embodiments of the present invention emerge from the detailed description of embodiments.

BRIEF DESCRIPTION OF THE DRAWINGS

Embodiments of the invention will now be illustrated, for exemplary purposes, in more detail by way of embodiments and with reference to the enclosed drawings, where similar references are used for similar parts, in which.

DETAILED DESCRIPTION

Figure 1:
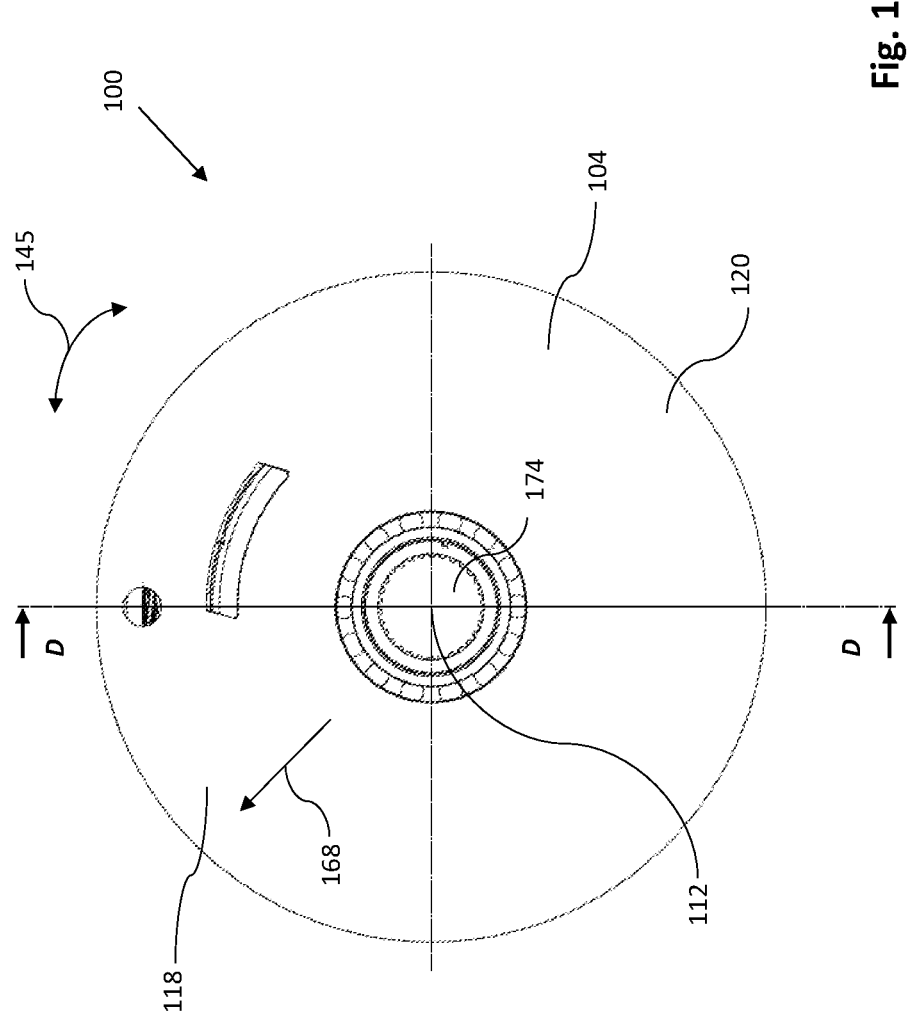
FIG. 1 is a schematic end view of an embodiment of the electric rotating machine according to the first aspect of the invention.

With reference to FIGS. 1 to 6, an embodiment of the electric rotating machine 100 according to the first aspect of the invention is schematically illustrated. With reference to FIGS. 7 to 18, a version, or an embodiment, and aspects of the fluid-guiding member 138 of the embodiment of the electric rotating machine 100 of FIGS. 1 to 6 are schematically illustrated.

With reference to FIGS. 1 to 6, the electric rotating machine 100 may act, or function, as an electric motor 104, for example for propelling a vehicle 300 (for example, see FIG. 20), such as an EV, and/or as an electric generator 104, for example, for charging one or more electric battery arrangements and/or one or more electric battery packs.

With reference to FIGS. 1 to 6, the electric rotating machine 100 includes a stator 106. The stator 106 may include one or more stator windings 108. The one or more stator windings 108 may include one or more end windings. The electric rotating machine 100 includes a rotor 110 rotatable about an axis of rotation 112 in relation to the stator 106. It may be defined that the stator 106 is spaced from the rotor 110 to form a gap 114 between the stator 106 and the rotor 110. The rotor 110 may include one or more permanent magnets. Thus, the electric rotating machine 100 may be a permanent magnet, PM, machine. However, for alternative embodiments, the electric rotating machine 100 be config-
ured for and operate according to other electrical operation
schemes for electric rotating machines. For example, for
alternative embodiments, the rotor may include one or more
rotor windings. Various conventional electric rotating
machines and various conventional electrical operation
schemes for conventional electric rotating machines are
known to the skilled person and are thus not discussed herein
in further detail.

With reference to FIGS. 1 to 6, the electric rotating
machine 100 includes a rotor compartment 116 holding the
rotor 110. It may be defined that the rotor 110 is located in
the rotor compartment 116, and/or that the rotor compart-
ment 116 houses the rotor 110. The electric rotating machine
100 may include a housing 118 which houses the stator 106
and the rotor 110. The housing 118 may define, or form, the
rotor compartment 116. For some embodiments, the electric
rotating machine 100 includes one or more gable units 120,
122 immovable in relation to the stator 106. For example,
the electric rotating machine 100 may include two gable
units 120, 122. The one or more gable units 120, 122 may
be part of the housing 118. Thus, for some embodiments, the
housing 118 includes the one or more gable units 120, 122.
For some embodiments, the gable unit 120, 122 may also be
referred to as an end unit. The rotor 110 may be located
between the two gable units 120, 122. It may be defined that
the axis of rotation 112 extends through, or penetrates, the
one or more gable units 120, 122. For example, the rotor 110
may be connected, or attached, to the one or more gable
units 120, 122, for example via one or more bearings 123.
For some embodiments, it may be defined that the rotor 110
is rotatable about the axis of rotation 112 in relation to the
gable unit 120, 122.

Figure 6:
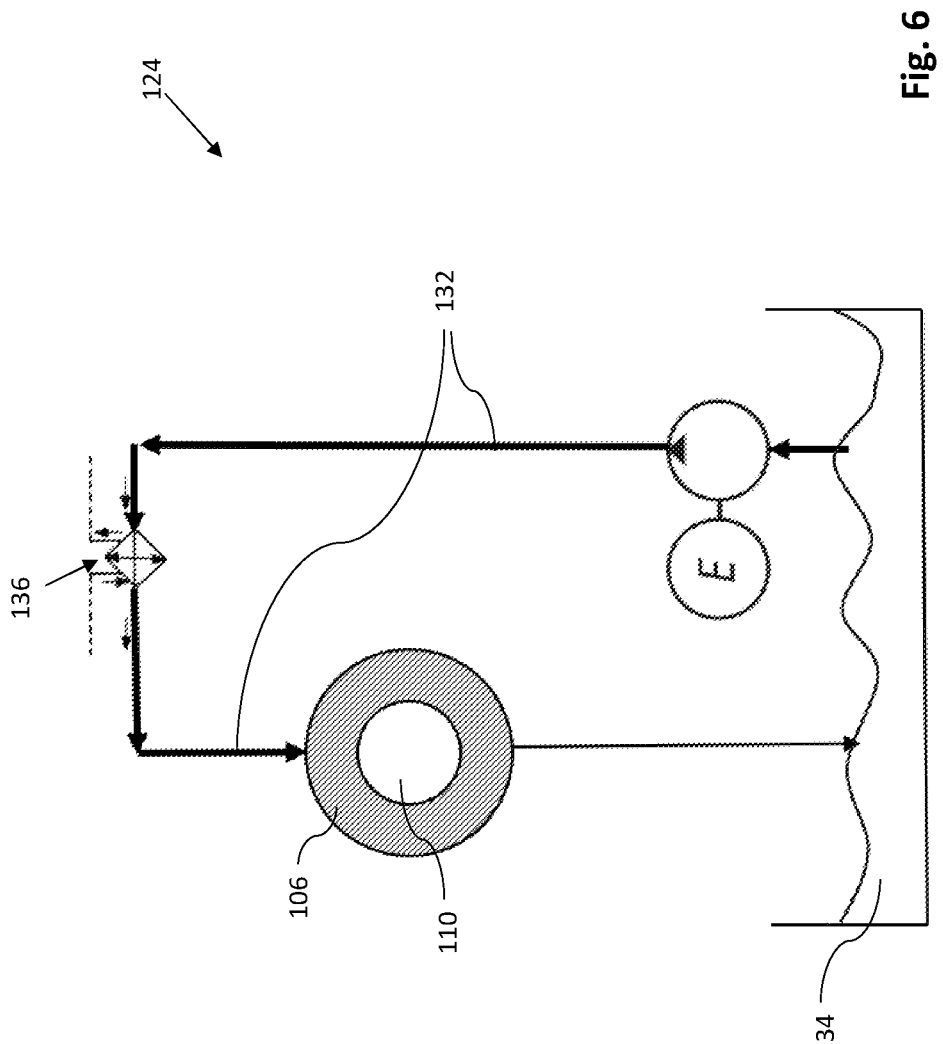
FIG. 6 is a schematic diagram illustrating a version of the fluid system for cooling one or more of the rotor and stator of an embodiment of the electric rotating machine according to the first aspect of the invention.

With reference to FIG. 6, the electric rotating machine
100 includes a fluid system 124 for cooling one or more of
the rotor 110 and stator 106. The fluid of the fluid system 124
may comprise or consist of one or more of the group of: a
liquid; a gas; and a gas mixture. The liquid may comprise or
consist of an oil or an oil mixture. Thus, a fluid of the fluid
system 124 may be an oil or an oil mixture.

Figure 2:
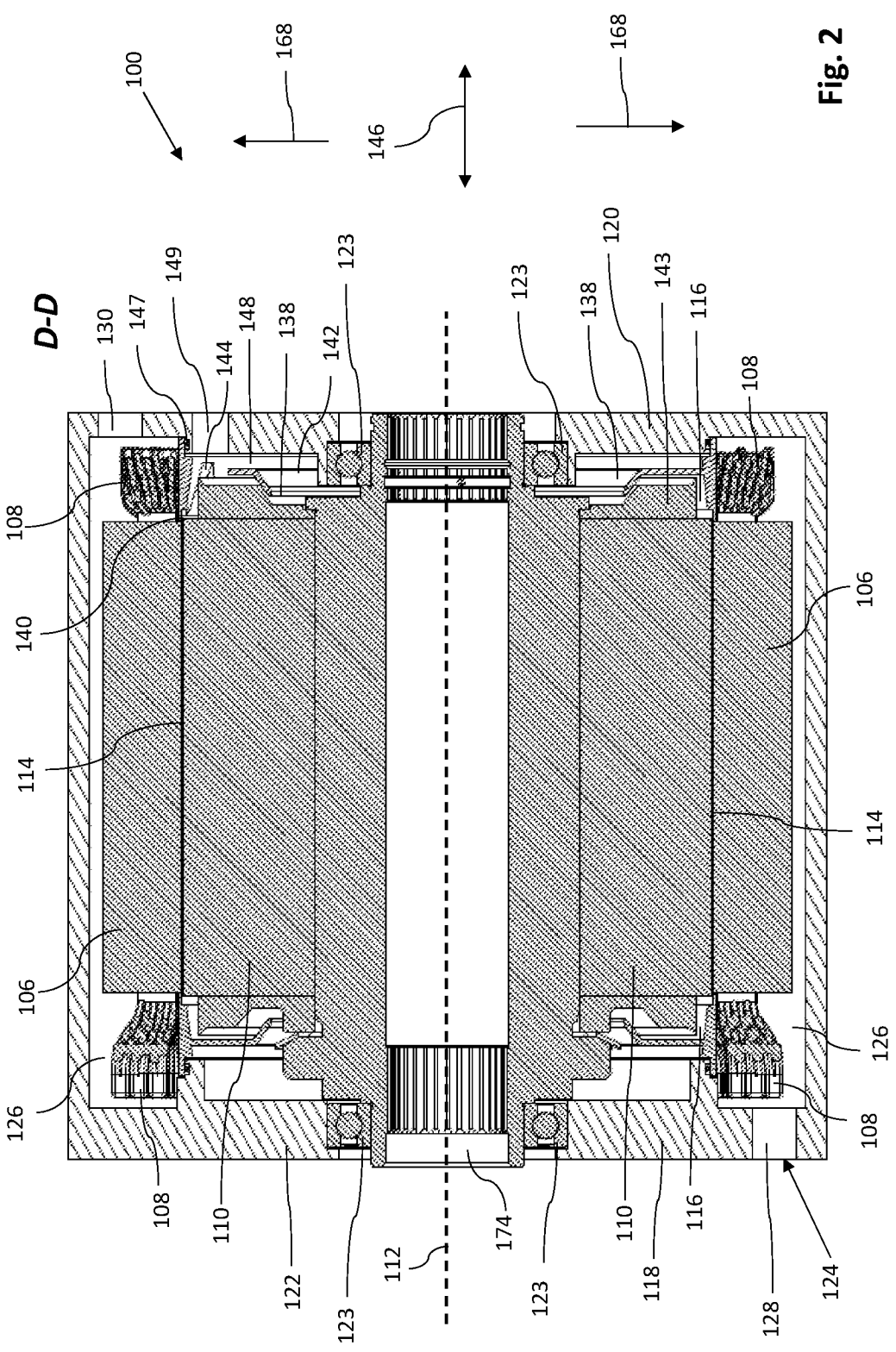
FIG. 2 schematically illustrates a cross-section of the electric rotating machine 2 along D-D in FIG. 2.

With reference to FIG. 2, the fluid system 124 may
include one or more channels 126 for guiding a fluid, for
example to and from the stator 106 and/or the rotor 110. The
housing 118 may include, or form, the one or more channels
126. The fluid system 124 may include an inlet 128 for the
inlet of fluid and an outlet 130 for the outlet of fluid. The
inlet 128 and the outlet 130 may be an inlet 128 and outlet
130 of the housing 118. The inlet 128 may be an inlet 128
for the inlet of fluid to the one or more channels 126. The
outlet 130 may be an outlet 130 for the outlet of fluid from
the one or more channels 126.

With reference to FIG. 6, the fluid system 124 may
include one or more conduits 132, or lines, for guiding a
fluid, for example to or from the one or more channels 126
and/or the housing 118. The fluid system 124 may include a
fluid collector and provider 134, 2 for example a fluid
collecting tray or vessel, or a fluid sump. For some embodi-
ments, the fluid collector and provider 134 may be fluidly
connected to the one or more channels 126 via a heat
exchanger 136. For some fluid systems 124, or fluid cooling
systems, some of the cooling fluid may inadvertently, or
unintentionally, end up in the rotor compartment 116 holding
the rotor 110. Cooling fluid present in the rotor compartment
116 and around the rotor 110 may impair the operation of the
electric rotating machine 100, for example by creating drag
losses. Thus, cooling fluid originating the from the fluid
cooling system may advantageously be removed from the rotor compartment 116 to improve the operation, or perfor-
mance, of the electric rotating machine 100, for example to
reduce drag losses.

Figure 3:
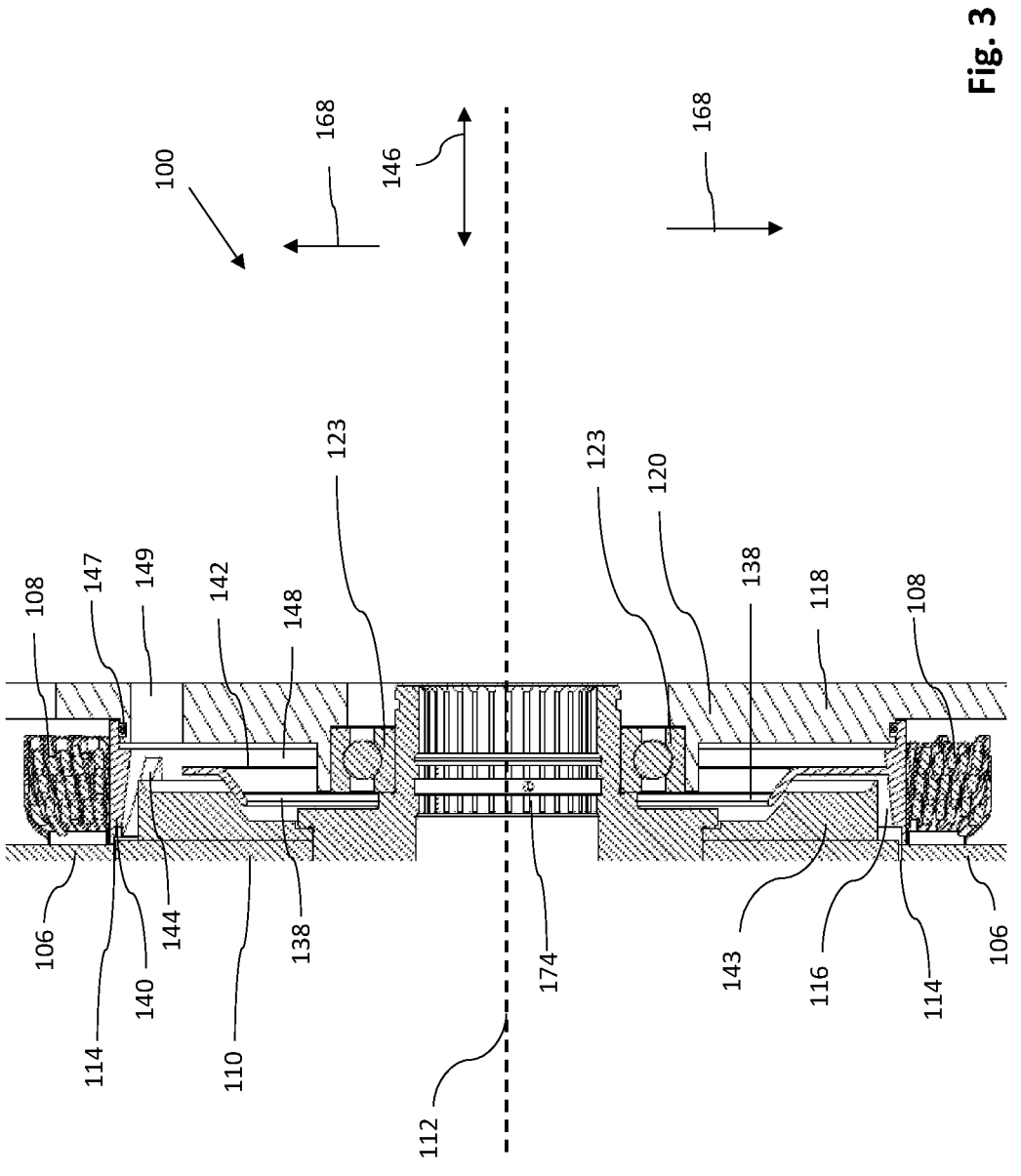
FIG. 3 is an enlargement of a portion of the cross-section of FIG. 2.
Figure 4:
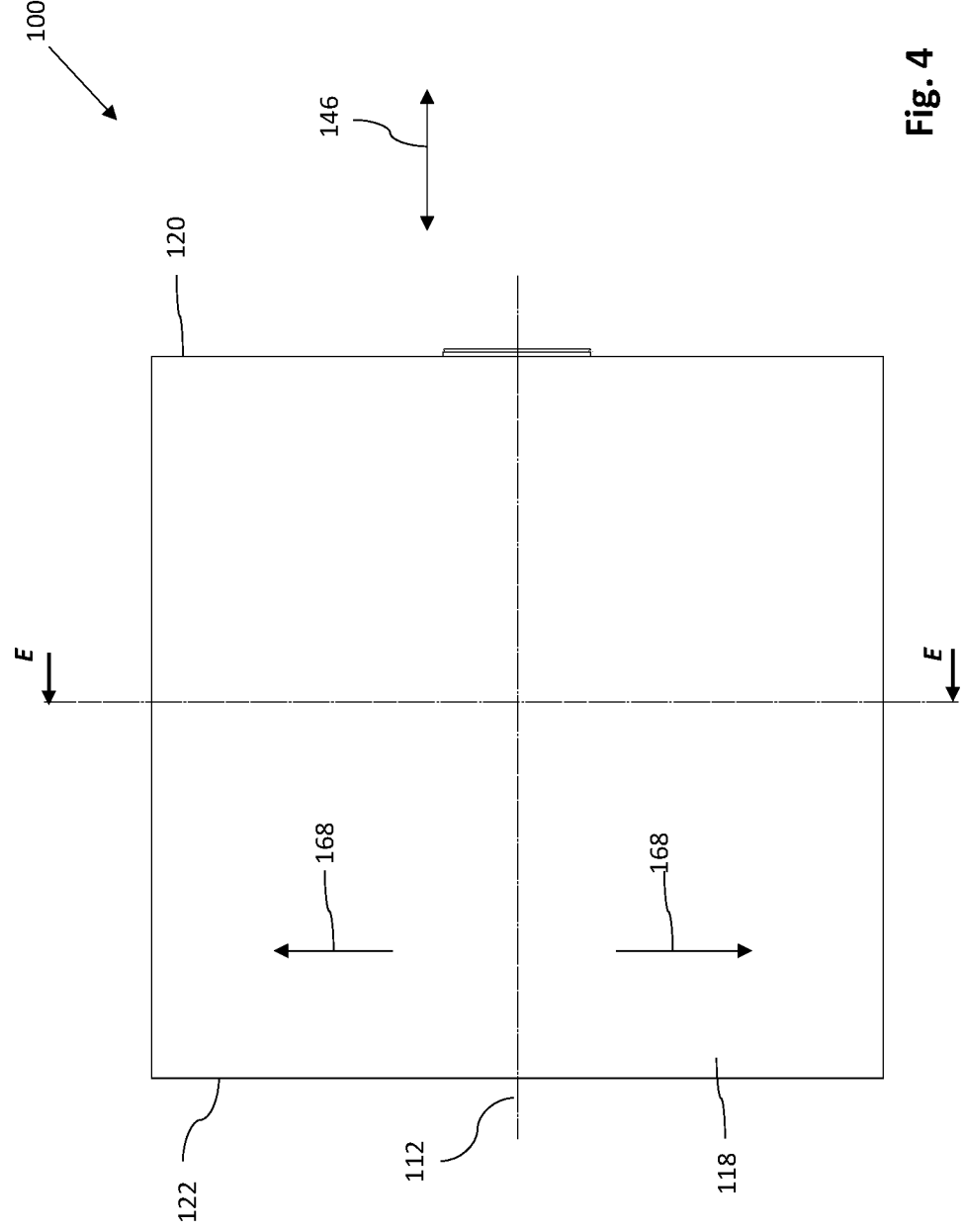
FIG. 4 is a schematic side view of the electric rotating machine FIGS. 1 and 2.
Figure 5:
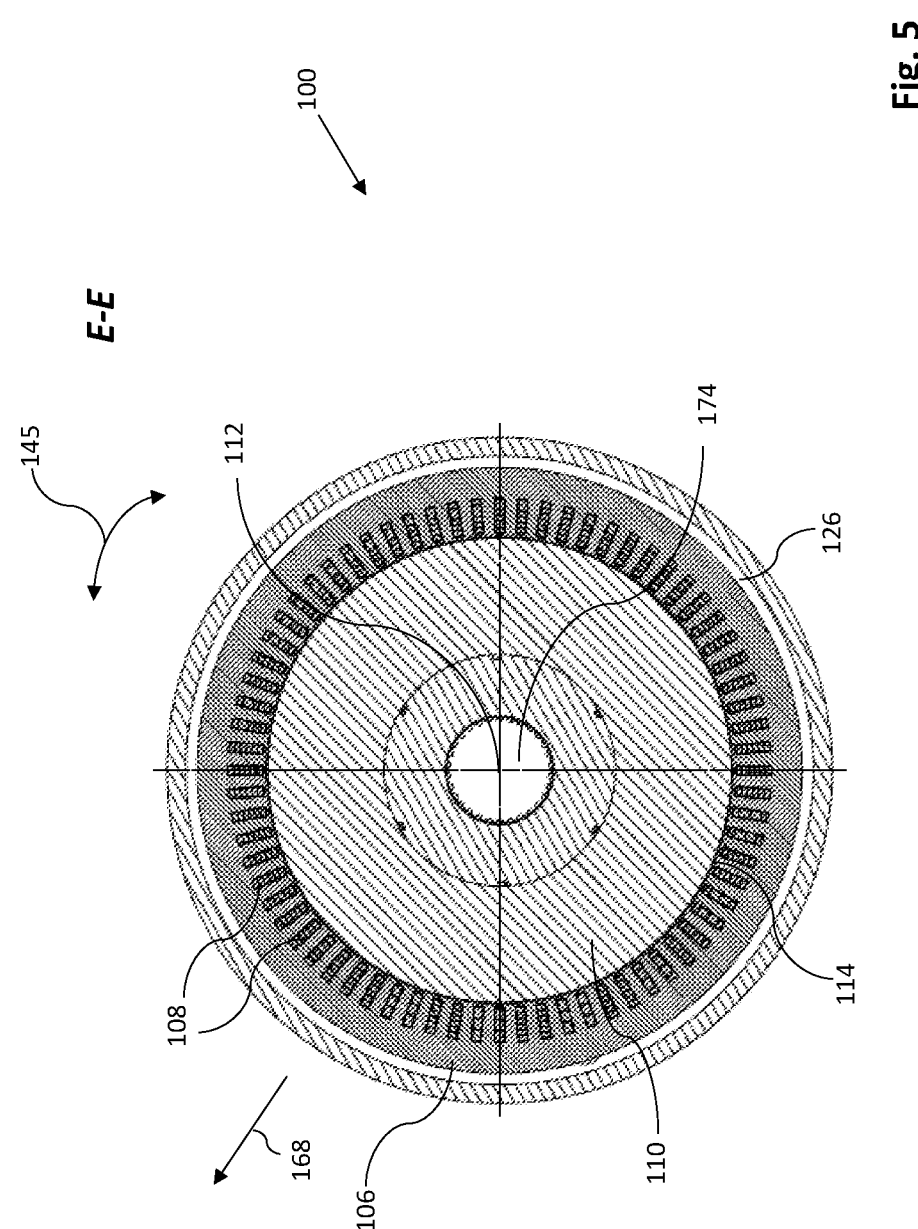
FIG. 5 schematically illustrates a cross-section of the electric rotating machine along E-E in FIG. 4.

With reference to FIGS. 2 and 3, the electric rotating
machine 100 includes a fluid-guiding member 138. The
fluid-guiding member 138 has a front 140 and a back 142.
The front 140 of the fluid-guiding member 138 faces the
rotor compartment 116 while the back 142 of the fluid-
guiding member 138 faces away from the rotor compartment
116. For some embodiments, it may be defined that the front
140 of the fluid-guiding member 138 faces the rotor 110
while the back 142 of the fluid-guiding member 138 faces
away from the rotor 110. The fluid-guiding member 138 may
be disclosed to be immovable in relation to the stator 106.
The rotor 110 may be described to be rotatable about the axis
of rotation 112 in relation to the fluid-guiding member 138.
The fluid-guiding member 138 may be disclosed to be
immovable in relation to the gable unit 120. The fluid-
guiding member 138 may be attachable, or attached, to the
gable unit 120. It may be defined that the fluid-guiding
member 138 is configured for the guidance of a fluid of the
fluid system 124, for example a fluid of any one of the sorts
mentioned above. In the embodiment illustrated in FIGS. 2
and 3, the electric rotating machine 100 includes one fluid-
guiding member 138, for example located adjacent to one of
the two axial ends of the rotor 110. However, for some
embodiments, the electric rotating machine may include two
fluid-guiding members 138, for example located adjacent to
different axial ends of the two axial ends of the rotor 110.

With reference to FIGS. 2, 3 and 7 to 14, the fluid-guiding
member 138 comprises a guide 144 for guiding a fluid, for
example a fluid of the fluid system 124, for example a 2 fluid
of any one of the sorts mentioned above. The guide 144
extends from the front 140 of the fluid-guiding member 138
toward the back 142 of the fluid-guiding member 138. The
guide 144 is configured to guide a fluid from the front 140
of the fluid-guiding member 138 to the back 142 of the
fluid-guiding member 138 upon rotation of the rotor 110, i.e.
when the rotor 110 rotates, in order to remove a fluid from
the rotor compartment 116. For some embodiments, a fluid
may be removed from the rotor compartment 116 without
making the rotor compartment 116 completely empty of a
fluid. The innovative fluid-guiding member 138 and guide
144 may be described to use the dynamic forces created
upon the rotation of the rotor 110 to guide a fluid away from
the rotor compartment 116. For example, the innovative
fluid-guiding member 138 and guide 144 need not to rely on
the influence of gravity on the fluid to remove fluid from the
rotor compartment 116. By way of the innovative fluid-
guiding member 138 and guide 144, cooling fluid uninten-
tionally located in the rotor compartment 116 is quickly
evacuated from the rotor compartment 116. The rotating
rotor 110, or the rotation of the rotor 110, may be described
to force, pull, or push fluid present in the rotor compartment
116, through the viscosity of the fluid and friction, for
example the friction between the fluid and the rotor 110
and/or walls of the rotor compartment 116, in the direction
of rotation 145 of the rotor 110 and/or in an outward radial
direction 168 and to provide for that the fluid hits the guide
144, or is received by the guide 144, and subsequently is
guided away, and/or removed, from the rotor compartment
116 by the guide 144, by being guided from the front 140 of
the fluid-guiding member 138 to the back 142 of the
fluid-guiding member 138 during the rotation of the rotor
110. For some embodiments, fluid present in the rotor
compartment 116, for example present at one axial end of
the rotor 110, may be described to follow a spiral-shaped path, or a partial spiral-shaped path, when being forced, pulled, or pushed, by the rotating rotor 110, or the rotation of the rotor 110, i.e. the fluid is moved both in the direction of rotation 145 of the rotor 110 and in an outward radial direction 168. For some embodiments, fluid present in the gap 114 between the stator 106 and the rotor 110 may travel outwardly in the direction 146 of the axis of rotation 112, for example in a direction toward an axial end of the rotor 110, under the influence of the rotating rotor 110, or the rotation of the rotor 110. The fluid leaving the gap 114 may be received by the fluid-guiding member 138 and/or the guide 144, and subsequently guided away, and/or removed, from the rotor compartment 116 by the guide 144. The fluid leaving the gap 114 may hit the fluid-guiding member 138 in an outward radial direction 168 and/or in the direction 146 of the axis of rotation 112 and be subsequently guided by the fluid-guiding member 138 and/or the guide 144.

With reference to FIGS. 2 and 3, the guide 144 may be disclosed to be immovable in relation to the stator 106. The rotor 110 may be described to be rotatable about the axis of rotation 112 in relation to the guide 144. The guide 144 may be disclosed to be immovable in relation to the gable unit 120.

With reference to FIG. 2, for some embodiments, the electric rotating machine 100 may include a rotor balancing disc 143, for example attached to the rotor 110. It may be defined that the rotor 110 includes the rotor balancing disc 143. For some embodiments, the electric rotating machine 100 may include one or more sealings, for example an O-ring 147, for sealing between the fluid-guiding member 138 and the gable unit 120, or the housing 118.

With reference to FIGS. 2 and 3, for some embodiments, the front 140 of the fluid-guiding member 138 may face the rotor compartment 116 in the direction 146 of the axis of rotation 112 while the back 142 of the fluid-guiding member 138 may face away from the rotor compartment 116 in the direction 146 of the axis of rotation 112. For some embodiments, when the electric rotating machine 100 includes a gable unit 120 immovable in relation to the stator 106, the back 142 of the fluid-guiding member 138 faces the gable unit 120 while the front 140 of the fluid-guiding member 138 faces away from the same gable unit 120. For some embodiments, a drain space 148 is formed between the gable unit 120 and the back 142 of the fluid-guiding member 138, wherein the drain space 148 is configured to drain a fluid away from the guide 144, for example away from the back 142 of the fluid-guiding member 138. For example, a fluid in the drain space 148 may be drained, or conveyed, by way of gravity, or under the influence of gravity. The drain space 148 may be fluidly connected to an outlet 149, which may be referred to as an evacuation outlet 149. For some embodiments, the fluid-guiding member 138 may be located between the gable unit 120 and the rotor 110.

With reference to FIGS. 2, 3 and 7 to 14, for some embodiments, the guide 144 extends from the front 140 of the fluid-guiding member 138 to the back 142 of the fluid-guiding member 138.

With reference to FIGS. 7 to 14, for some embodiments, the guide 144 includes, or forms, one or more sloping surfaces 150, 152 for guiding a fluid, for example a fluid originating from the fluid system 124, for example a fluid of any one of the sorts mentioned above. In the embodiment shown in the figures, the guide 144 includes two sloping surfaces 150, 152. However, for alternative embodiments, the guide 144 may include one sloping surface 150, 152 only, or more than two sloping surfaces 150, 152. The sloping surface 150, 152 may be described to be sloping in relation to the axis of rotation 112. For example, an angle may be formed between the sloping surface 150, 152 and the axis of rotation 112. It may be defined that the guide 144 is configured to guide a fluid from the front 140 of the fluid-guiding member 138 to the back 142 of the fluid-guiding member 138 on the one or more sloping surfaces 150, 152 upon rotation of the rotor 110 to remove a fluid from the rotor compartment 116, for example a fluid originating from the fluid system 124, for example a fluid of any one of the sorts mentioned above. The fluid may be described to be guided along the one or more sloping surfaces 150, 152.

Figure 7:
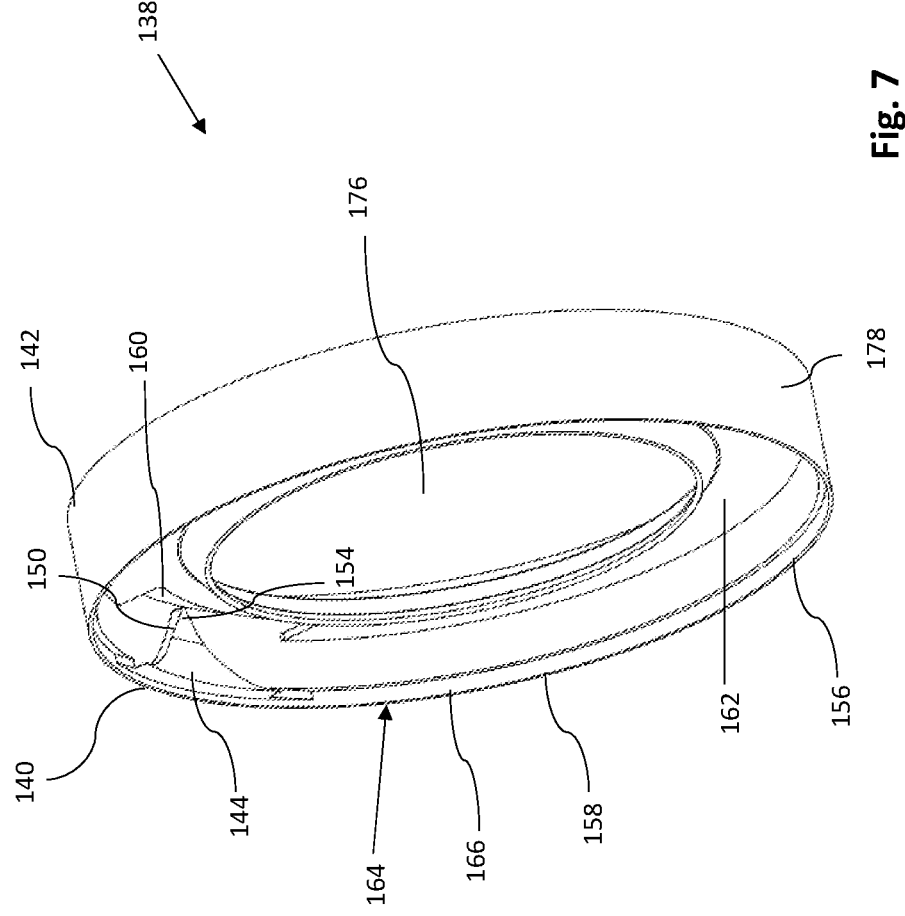
FIG. 7 is a schematic perspective view of a version of the fluid-guiding member of an embodiment of the electric rotating machine according to the first aspect of the invention.
Figure 8:
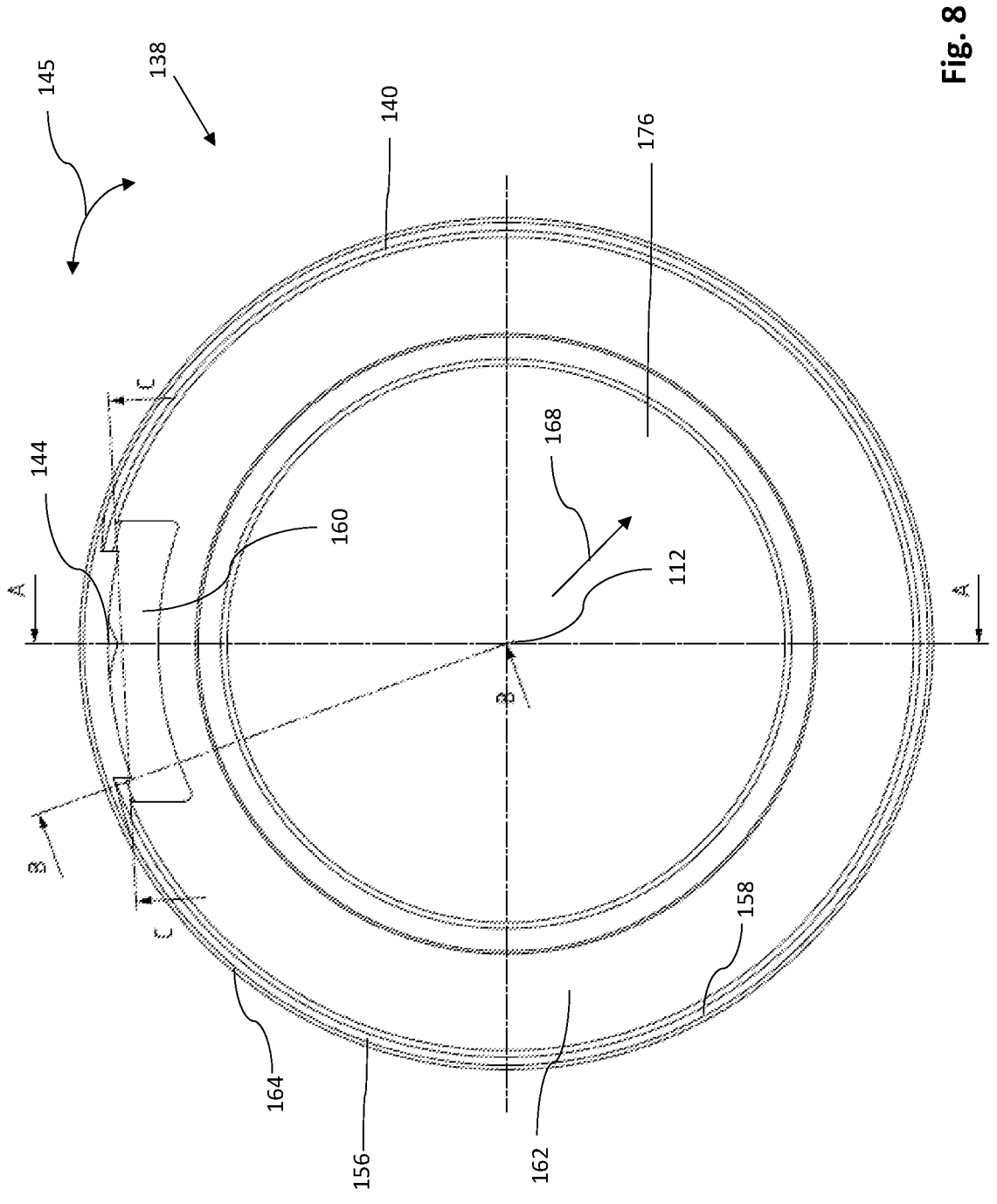
FIG. 8 is a schematic front view of the fluid-guiding member of FIG. 7.
Figure 9:
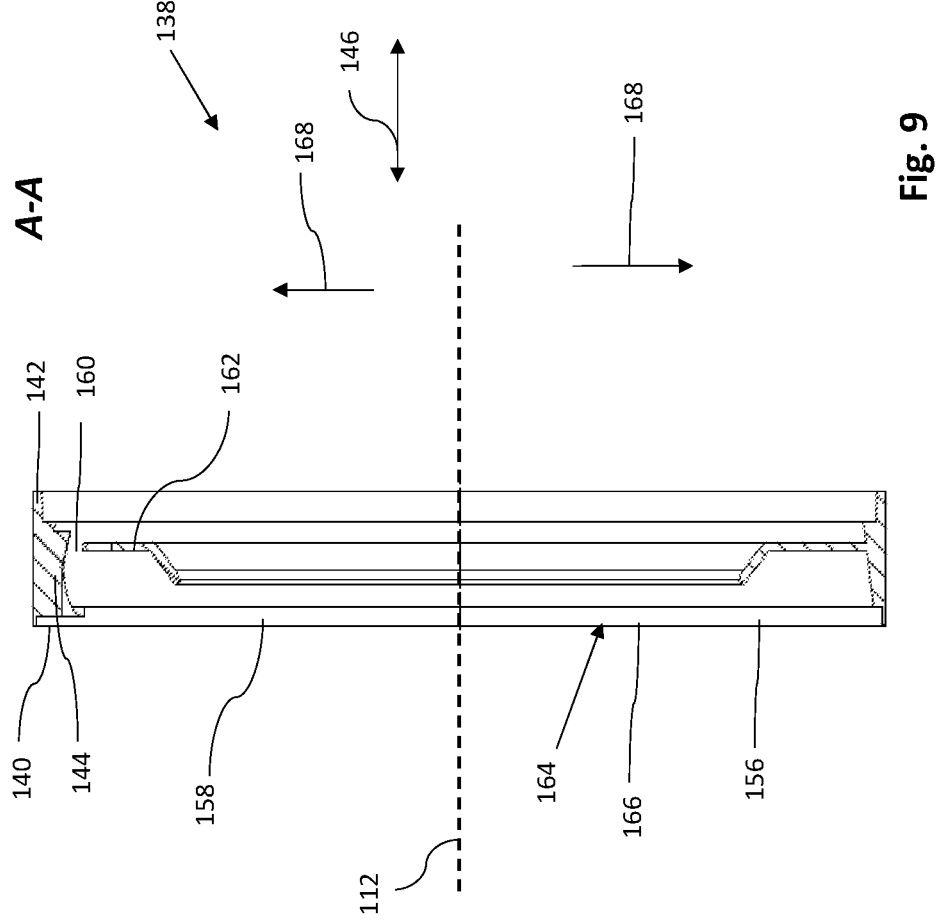
FIG. 9 schematically illustrates a cross-section of the fluid-guiding member along A-A in FIG. 8.
Figure 10:
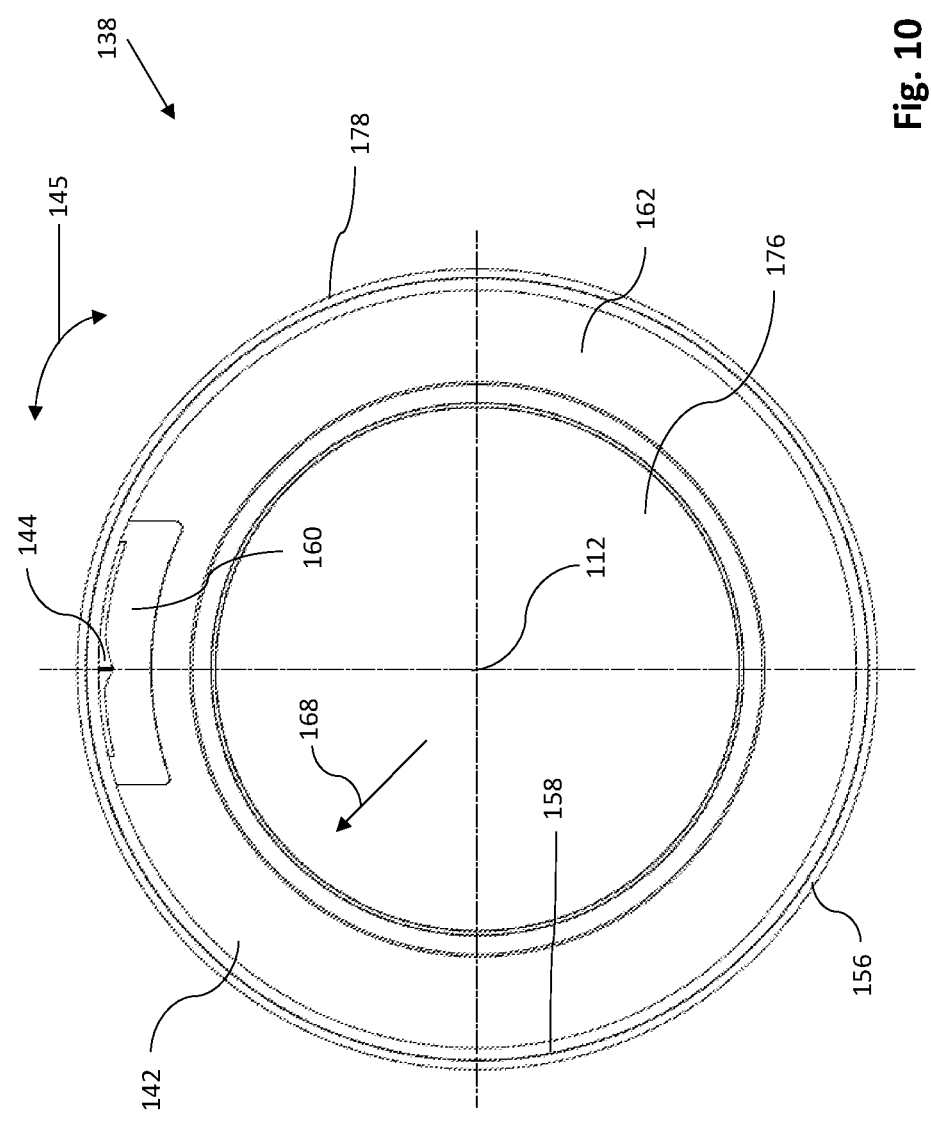
FIG. 10 is a schematic back view of the fluid-guiding member of FIG. 7.
Figure 11:
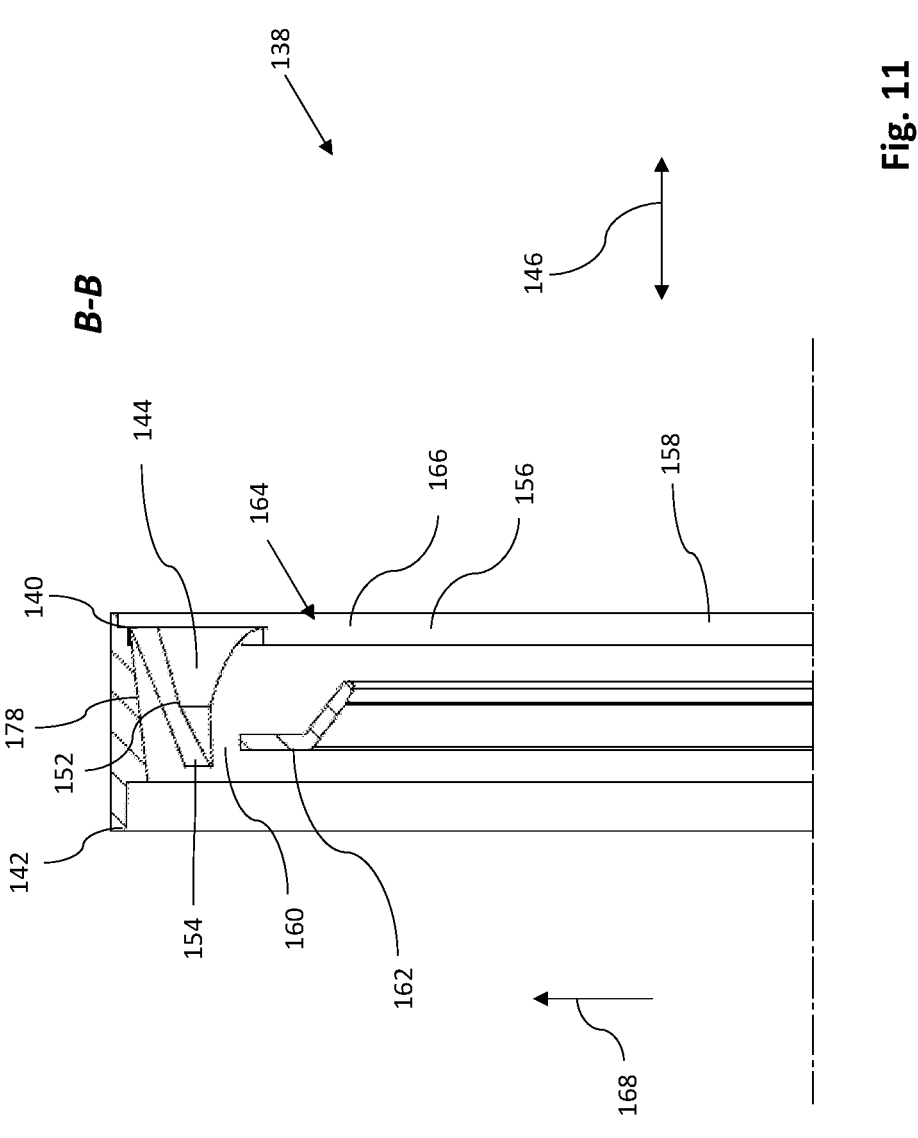
FIG. 11 schematically illustrates a cross-section of the fluid-guiding member along B-B in FIG. 8.
Figure 12:
FIG. 12 schematically illustrates a cross-section of the fluid-guiding member along C-C in FIG. 8.
Figure 12:
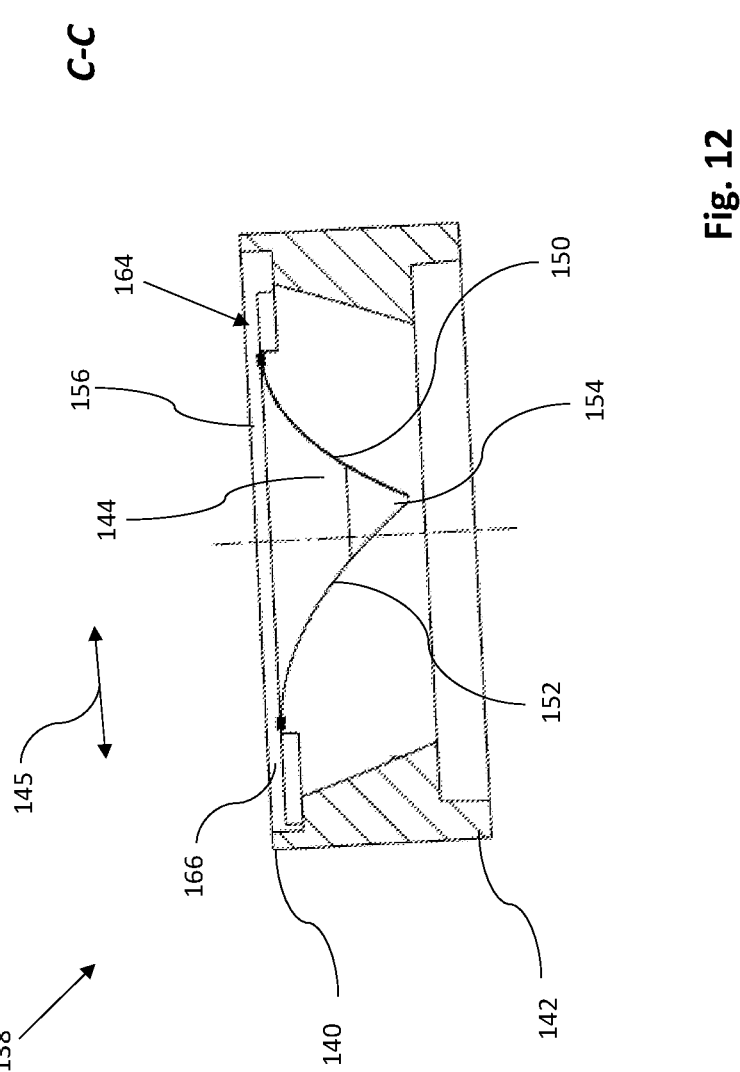
Figure 13:
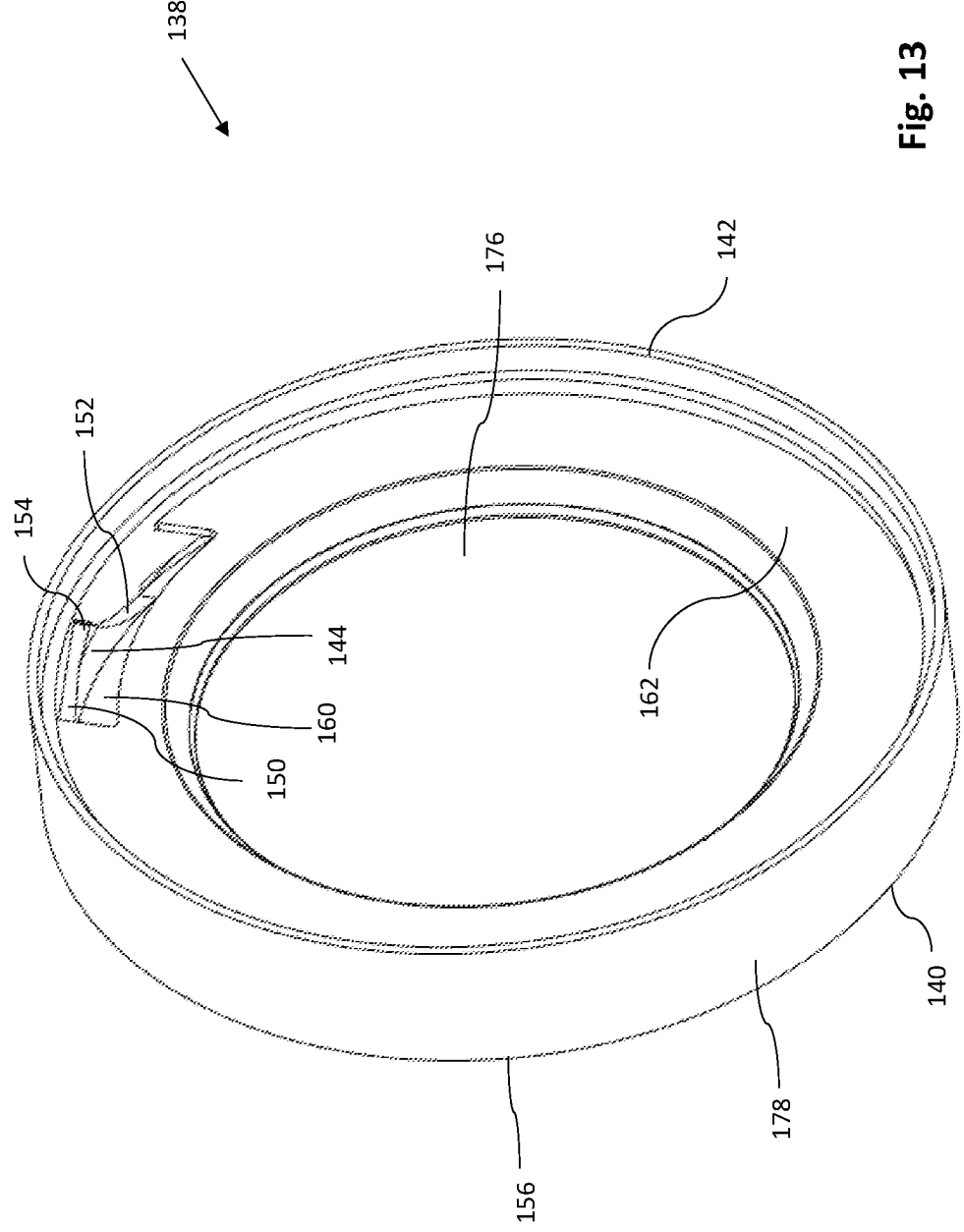
FIG. 13 is a schematic perspective view of a version of the fluid-guiding member of FIG. 7 viewing the back of the fluid-guiding member.
Figure 14:
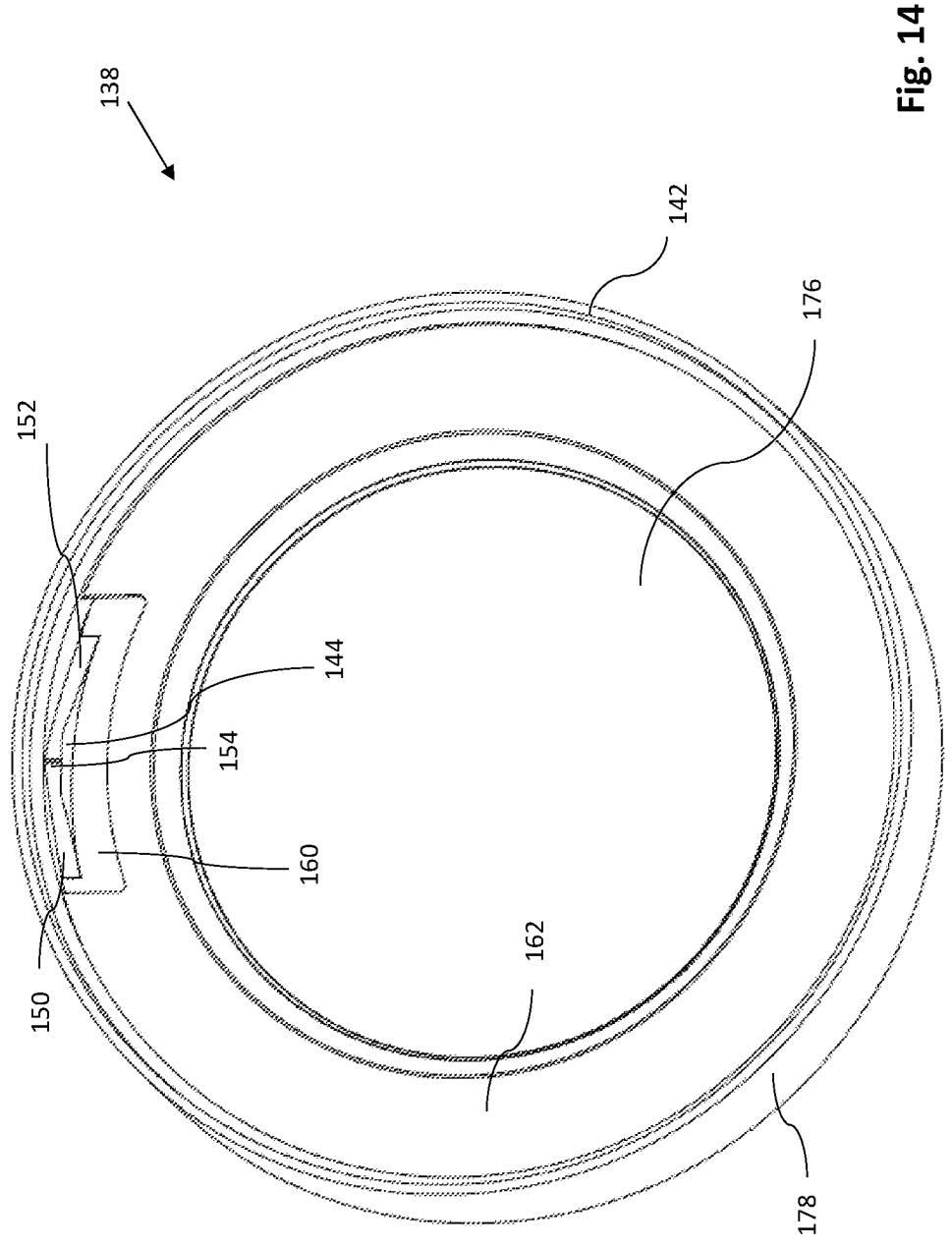
FIG. 14 is a schematic perspective view of the fluid-guiding member of FIG. 14 from a different perspective but still viewing the back of the fluid-guiding member.
Figure 15:
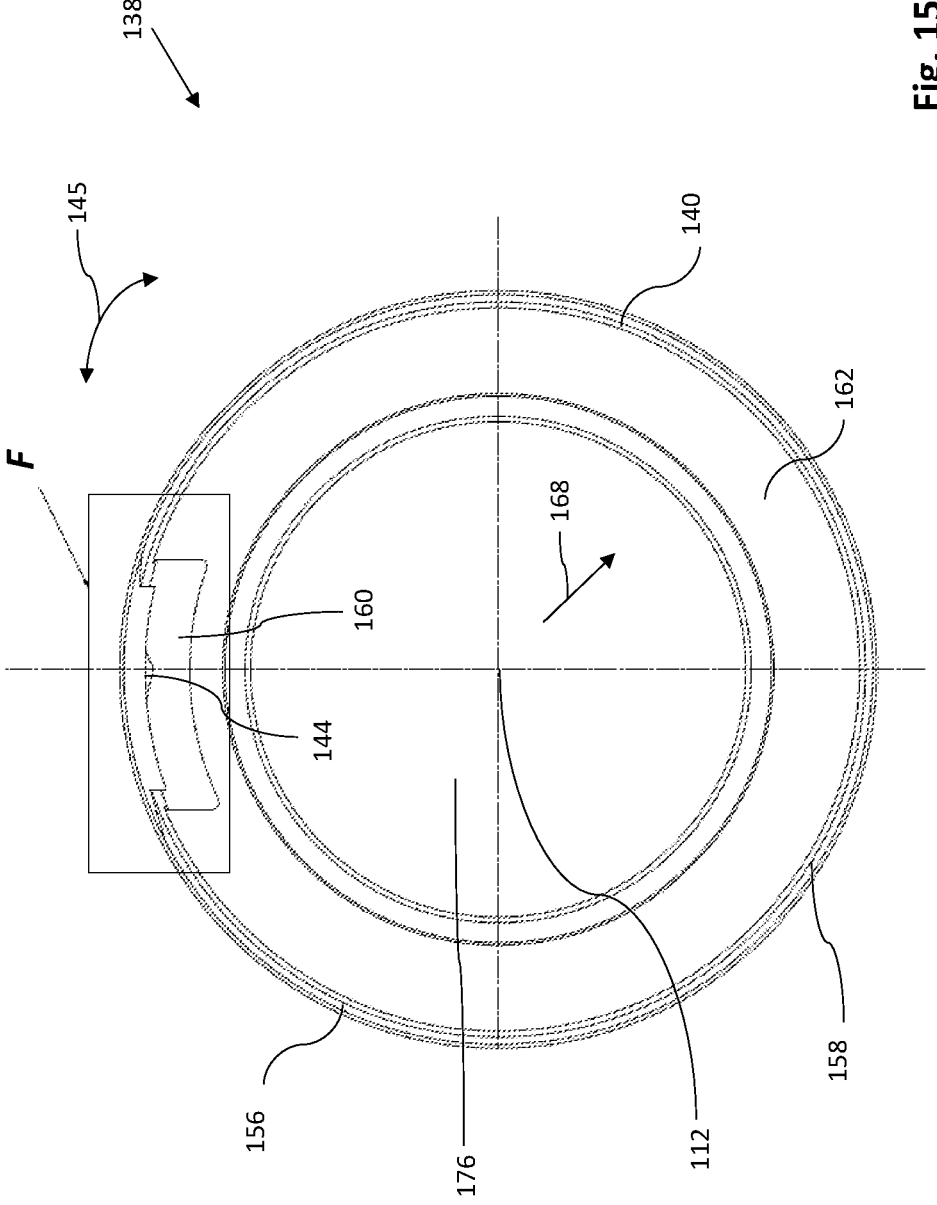
FIG. 15 is a schematic front view of the fluid-guiding member of FIG. 7.
Figure 16:
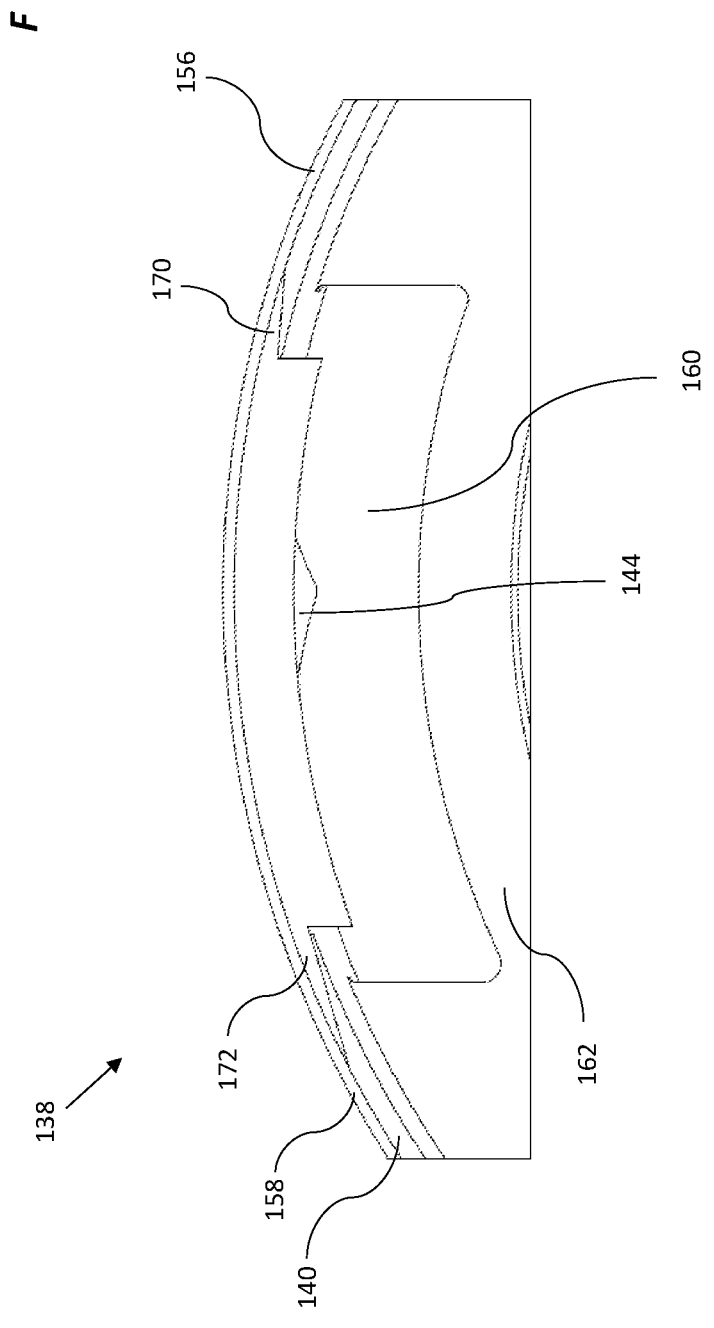
FIG. 16 is an enlargement of the region F of FIG. 15.
Figure 17:
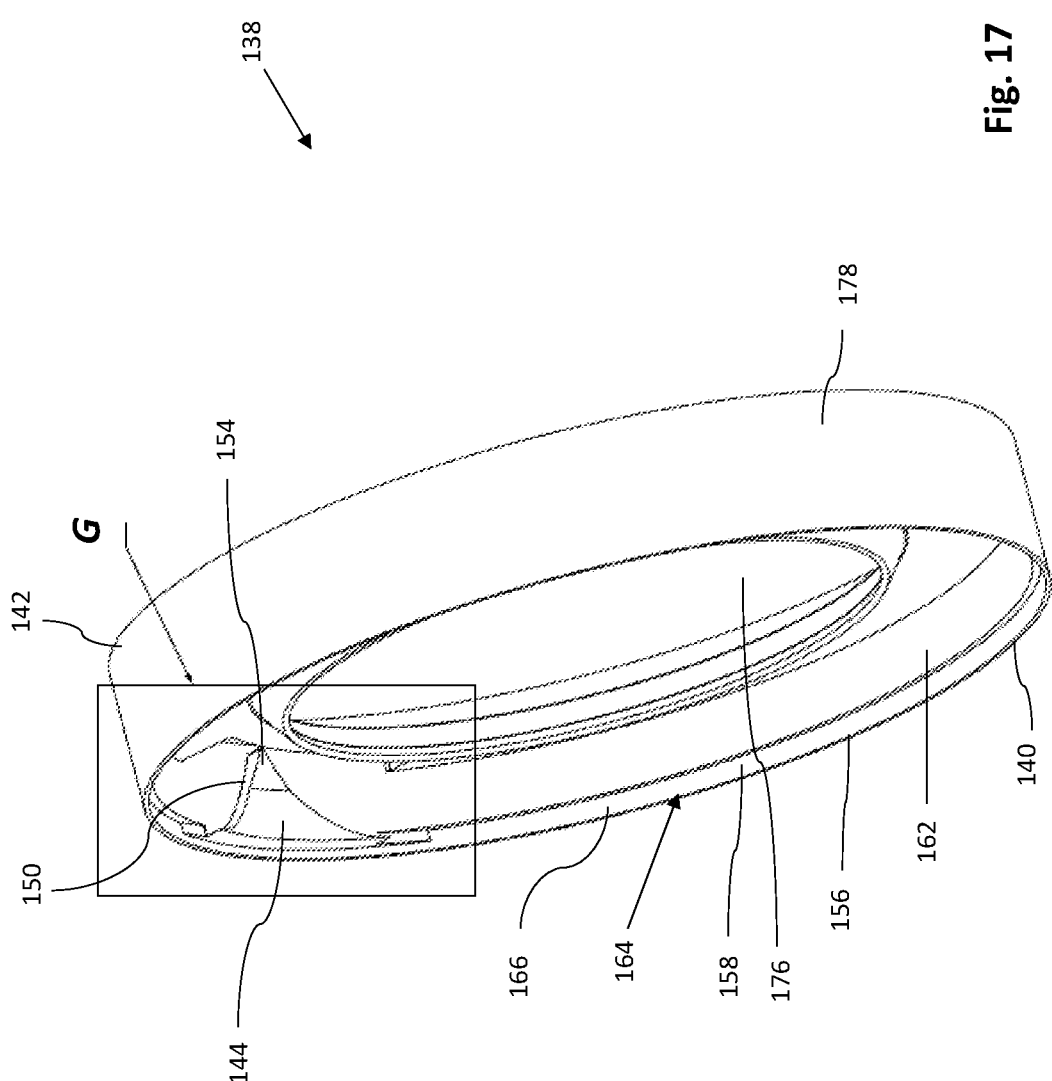
FIG. 17 is a schematic perspective view of the fluid-guiding member of FIG. 7 viewing the front of the fluid-guiding member.
Figure 18:
FIG. 18 is an enlargement of the region G of FIG. 17.
Figure 18:
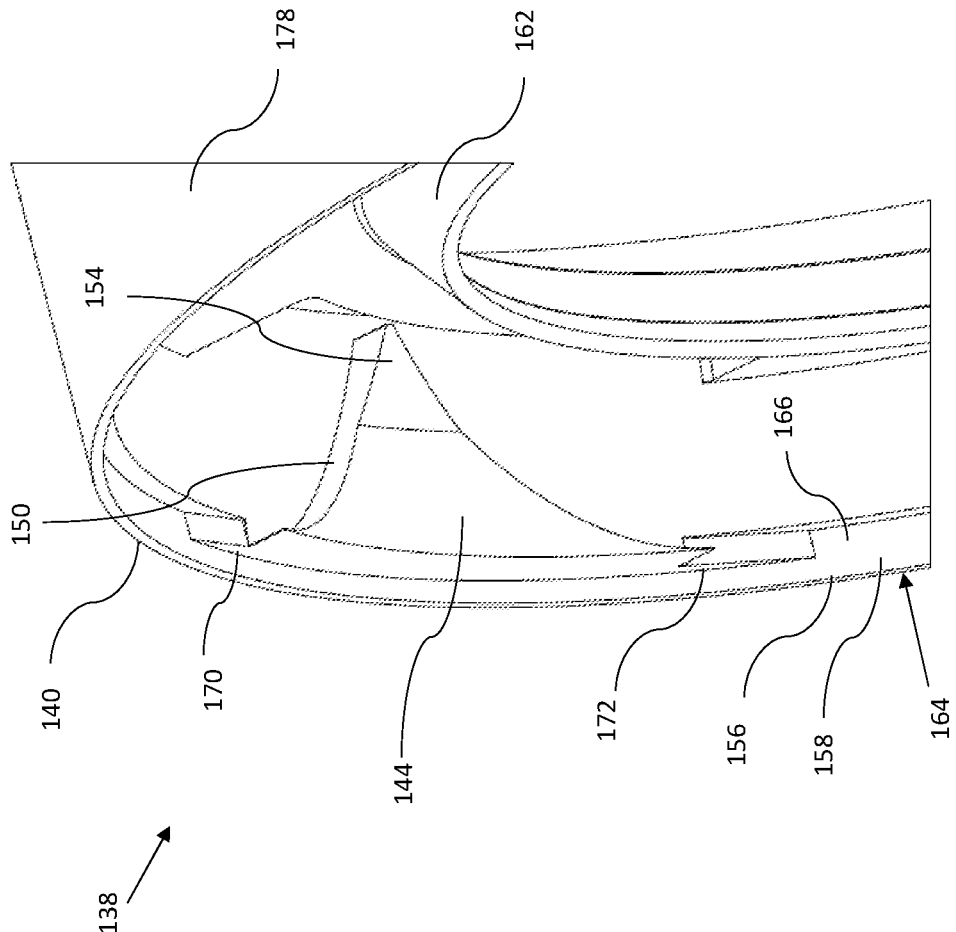

With reference to FIGS. 3 and 7 to 14, the sloping surface 150, 152 may extend from the front 140 of the fluid-guiding member 138 toward the back 142 of the fluid-guiding member 128. More specifically, for some embodiments, the sloping surface 150, 152 extends to the back 142 of the fluid-guiding member 138. With reference to FIGS. 7 and 12, one or more of the one or more sloping surfaces 150, 152 may be concave. Thus, the sloping surface 150, 152 may be described to be concave.

With reference to FIG. 12, the guide 144 may comprise two opposing sloping surfaces 150, 152. With reference to FIG. 7, the two opposing sloping surfaces 150, 152 may be described to be opposite one another in the direction of rotation 145 of the rotor 110. By providing two opposing sloping surfaces 150, 152, the two opposing sloping surfaces 150, 152 may guide a fluid when the rotor 110 rotates in any one of two directions of rotation 145. With reference to FIGS. 7 and 12, the guide 144 may include, or form, an apex 154 pointing in the direction toward the back 142 of the fluid-guiding member 138. When the guide 144 includes an apex 154, the two opposing sloping surfaces 150, 152 may be joined in, or by, the apex 154. The apex 154 may be described to extend to the back 142 of the fluid-guiding member 138. For some embodiments, the two opposing sloping surfaces 150, 152 and the apex 154 may be described to form a wedge shape.

With reference to FIGS. 3 and 7 to 14, for some embodiments, the fluid-guiding member 138 has a periphery 156 surrounding the axis of rotation 112. The guide 144 may adjoin the periphery 156 of the fluid-guiding member 138 at the front 140 of the fluid-guiding member 138. The periphery 156 of the fluid-guiding member 138 may be described to guide a fluid upon rotation of the rotor 110, for example toward, or to, the guide 144. The periphery 156 of the fluid-guiding member 138 may include, or define, a peripheral path 158 at the front 140 of the fluid-guiding member 138. The peripheral path 158 is configured to guide a fluid upon rotation of the rotor 110. The guide 144 may adjoin the peripheral path 158. The rotating rotor 110, or the rotation of the rotor 110, may be described to force, pull, or push fluid present in the rotor compartment 116, through the viscosity of the fluid and friction, for example the friction between the fluid and the rotor 110 and/or walls of the rotor compartment 116, in the direction of rotation 145 of the rotor 110 along or on the periphery 156 of the fluid-guiding member 138, and/or along or on the peripheral path 158, to the guide 144.

With reference to FIGS. 3 and 7 to 14, the fluid-guiding member 138 may form a peripheral opening 160 between the front 140 of the fluid-guiding member 138 and the back 142 of the fluid-guiding member 138. The guide 144 may enter the peripheral opening 160. The guide 144 may be described to extend from the front 140 of the fluid-guiding member 138 to the back 142 of the fluid-guiding member 138 via the peripheral opening 160. The fluid-guiding member 138 may include a disc 162 which forms the peripheral opening 160.

With reference to FIGS. 7 to 14, the periphery 156 of the fluid-guiding member 138 may be annular. More specifically, for some embodiments, the periphery 156 of the fluid-guiding member 138 may even be circular.

With reference to FIGS. 3 and 7 to 14, the periphery 156 of the fluid-guiding member 138 may include a wall 164 at the front 140 of the fluid-guiding member 138. The wall 164 has an inner surface 166 facing the axis of the rotation 112. The inner surface 166 of the wall 164 is configured to receive a fluid upon rotation of the rotor 110. Thus, the wall 164 may be described to be arranged such that a fluid hits the inner surface 166 of the wall 164 upon rotation of the rotor 110, for example a fluid leaving the rotor 110 and travelling in an outward radial direction 168 upon rotation of the rotor 110, for example an outward radial direction 168 in relation to the axis of rotation 112, for example outward from the axis of rotation 112. The fluid travelling in an outward radial direction 168 upon rotation of the rotor 110 may travel, or flow, in the rotor compartment 116 between the rotor 110 and the gable unit 120, or more specifically, between the rotor 110 and the fluid-guiding member 138, for example between the rotor 110 and the front 140 of the fluid-guiding member 138. The wall 164 of the periphery 156 of the fluid-guiding member 138 may be called a peripheral wall. It may be defined that the wall 164 extends along the periphery 156 of the fluid-guiding member 138. By way of the wall 164 and its inner surface 166, a fluid leaving the rotor 110 and travelling in an outward radial direction 168 upon rotation of the rotor 110 may be efficiently collected and further guided on or along periphery 156 of the fluid-guiding member 138, and further guided on or along to the guide 144 to the back 142 of the fluid-guiding member 138. The inner surface 166 of the wall 164 may be annular. More specifically, for some embodiments, the inner surface 166 of the wall 164 may even be circular. For some embodiments, it may be defined that the inner surface 166 of the wall 164 is provided with the peripheral path 158 mentioned above.

With reference to FIGS. 15 to 18, the guide 144 may include one or more ramps 170, 172. At the front 140 of the fluid-guiding member 138, the periphery 156 of the fluid-guiding member 138 and each one 150, 152 of one or more of the one or more sloping surfaces 150, 152 may be joined via the one or more ramps 170, 172. The ramp 170, 172 may be described to collect a fluid and guide a fluid to the sloping surface 150, 152. For some embodiments, it may be defined that the ramp 170, 172 is configured to lift, or elevate, a fluid from the periphery 156 of the fluid-guiding member 138 at the front 140 of the fluid-guiding member 138 to one of the one or more sloping surfaces 150, 152 upon rotation of the rotor 110.

With reference to FIGS. 2, 3 and 7 to 14, the electric rotating machine 100 may include a shaft 174 rotatable about the axis of rotation 112 in relation to the stator 106. The shaft 174 is rotatable with the rotor 110. For some embodiments, the fluid-guiding member 138 forms a central opening 176, and the shaft 174 may extend through, or engages, the central opening 176. The disc 162 of the fluid-guiding member 138 may form the central opening 176. For example, the shaft 174 may be connected, or attached, to the one or more gable units 120, 122 via one or more bearings 123. However, for some embodiments, the electric rotating machine 100 may be shaft-free.

With reference to FIG. 7, the fluid-guiding member 138 may comprise one or more side walls 178 connecting, or joining, the front 140 of the fluid-guiding member 138 to the back 142 of the fluid-guiding member 138. For some embodiments, the fluid-guiding member 138 is made of a material comprising or consisting of a metal or a metal alloy. However, other materials are possible, for example a material comprising or consisting of a polymer or a polymer composite.

With reference to FIGS. 1 to 14, for some embodiments, the fluid-guiding member 138 may include two or more guides 144. For some embodiments, the fluid-guiding member 138 may include two or more peripheral openings 160. For example, the fluid-guiding member 138 may include two guides 144 which are opposite one another in relation to the axis of rotation 112. For example, the fluid-guiding member 138 may include two peripheral openings 160 which are opposite one another in relation to the axis of rotation 112.

Figure 19:
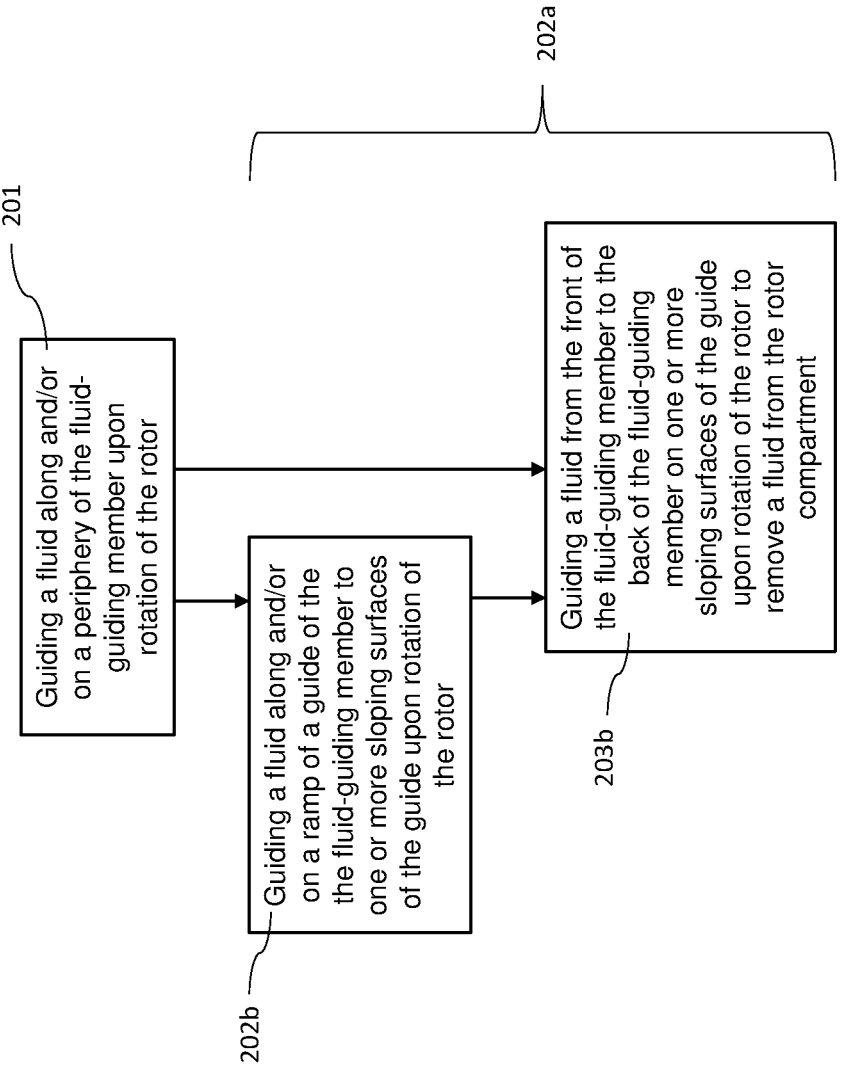
FIG. 19 a schematic flow chart illustrating aspects of embodiments of the method according to the second aspect of the invention.

With reference to FIG. 19, aspects of embodiments of the method for removing a fluid from a rotor compartment 116 holding a rotor 110 of an electric rotating machine 100 having a stator 106 are schematically illustrated, wherein the fluid originates from a fluid system 124 for cooling one or more of the rotor 110 and stator 106, wherein the electric rotating machine 100 includes the stator 106, the rotor 110 rotatable about an axis of rotation 112 in relation to the stator 106, the rotor compartment 116, the fluid system 124, and a fluid-guiding member 138 having a front 140 and a back 142, wherein the front 140 of the fluid-guiding member 138 faces the rotor compartment 116 while the back 142 of the fluid-guiding member 138 faces away from the rotor compartment 116, wherein the fluid-guiding member 138 comprises a guide 144 for guiding a fluid, and wherein the guide 144 extends from the front 140 of the fluid-guiding member 138 toward the back 142 of the fluid-guiding member 138, wherein the method comprises:

guiding 201 a fluid along and/or on a periphery 156 of the fluid-guiding member 138 upon rotation of the rotor 110, for example in a direction of rotation 145; and guiding 202a a fluid from the front 140 of the fluid-guiding member 138 to the back 142 of the fluid-guiding member 138 by way of, or by means of, the guide 144 and upon rotation of the rotor 110 to remove a fluid from the rotor compartment 116. For some embodiments, a fluid may be removed from the rotor compartment 116 without making the rotor compartment 116 completely empty of a fluid. Thus, for some embodiments, the amount of fluid present in the rotor compartment 116 may be reduced.

With reference to FIG. 19, for some embodiments, the step of guiding 201 a fluid along and/or on a periphery 156 of the fluid-guiding member 138 upon rotation of the rotor 110 may include the guidance of the fluid to a ramp 170, 172 of the guide 144 of the fluid-guiding member 138.

With reference to FIG. 19, for some embodiments, the step of guiding 202a a fluid from the front 140 of the fluid-guiding member 138 to the back 142 of the fluid-guiding member 138 by way of the guide 144 may include the steps of:

guiding 202b a fluid along and/or on the ramp 170, 172 of the guide 144 of the the the fluid-guiding member 138 to one or more sloping surfaces 150, 152 of the guide 144 upon rotation of the rotor 110; and guiding 203*b* a fluid from the front 140 of the fluid-guiding member 138 to the back 142 of the fluid-guiding member 138 on the one or more sloping surfaces 150, 152 upon rotation of the rotor 110 to remove a fluid from the rotor compartment 116.

It is to be understood that for some embodiments of the method, one or more additional steps may be added, or one or more of the steps disclosed above may be excluded.

Figure 20:
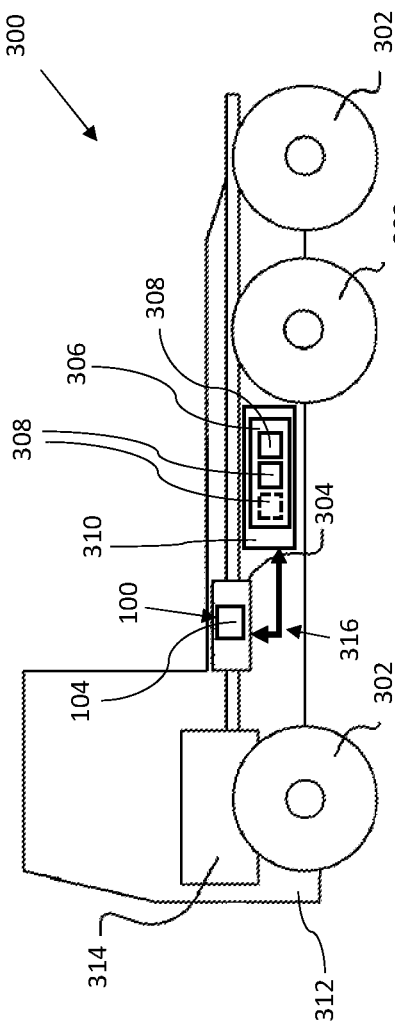
FIG. 20 is a schematic side view of an embodiment of the vehicle according to the third aspect.

With reference to FIG. 20, an embodiment of the vehicle 300 according to the third aspect of the invention is schematically illustrated. The vehicle 300 includes one or more electric rotating machines 100 according to any one of the embodiments disclosed above or below. The one or more electric rotating machines 100 may comprise one or more electric motors 104 and/or one or more electric generators 104. For example, the one or more electric motors 104 may be configured for propelling the vehicle. For example, one or more electric generators 104 may be configured for charging one or more electrical battery arrangements 306 and/or one or more electric battery packs 310.

With reference to FIG. 20, the vehicle 300 is illustrated as a tractor vehicle. However, in other embodiments, the vehicle 300 may, for example, be a bus, a truck, a heavy truck or a car. Other types of vehicles are also possible. The vehicle 300 may be an electric vehicle, EV, for example a hybrid vehicle or a hybrid electric vehicle, HEV, or a battery electric vehicle, BEV.

With reference to FIG. 20, the vehicle 300 may be a wheeled vehicle, i.e. a vehicle 300 having wheels 302. Only the wheels 302 on the left-hand side of the vehicle 300 are visible in FIG. 20. It is to be understood that the vehicle 300 may have fewer or more wheels than what is shown in FIG. 20. The vehicle 300 may comprise a powertrain 304, for example configured for one of an EV, HEV and BEV. The vehicle 300 may be configured to hold or carry, or may include, one or more electrical battery arrangements 306 including two or more electric battery cells 308. The vehicle 300 may be configured to hold or carry, or may include, one or more electric battery packs 310 including two or more electric battery cells 308 and/or including two or more electrical battery arrangements 306, which may be referred to as modules. The electrical battery arrangement 306 and/or the electric battery pack 310 may, for example, be attachable to a chassis 312 of the vehicle 300. It is to be understood that the vehicle 300 may include further unites, components, such as electrical and/or mechanical components, a combustion engine 314 and other devices required for a vehicle 300, such as for an EV, HEV or BEV.

With reference to FIG. 20, it may be defined that the powertrain 304 and/or the one or more electric motors 104 is/are configured to propel, or drive, the vehicle 300. It may be defined that the powertrain 304 includes the electrical battery arrangement 306 and/or the electric battery pack 310. The one or more electric rotating machines 100 may be located at locations different from what is illustrated in FIG. 20, for example in connection with the combustion engine 314, for example acting as an electric generator.

With reference to FIG. 20, the vehicle 300 may include a vehicle electrical system 316. It may be defined that the vehicle electrical system 316 is configured for direct current. It may be defined that vehicle electrical system 316 is a vehicle high voltage system 316. It may be defined that the vehicle high voltage system 316 is configured for a high voltage, such as a voltage above 60 V, for example above 400 V, or above 450 V, such as above 650 V. For example, the vehicle high voltage system 316 may be configured for a voltage up to 1500 V and/or for a voltage above 1500 V. The electric power, or the electric current, for example the direct current, of the vehicle electrical system 316 may be transferred at a high voltage, for example at one or more of the voltages levels mentioned above. The vehicle electrical system 316 may be configured to transfer the electric power, or the electric current, at a high voltage, for example at one or more of the voltages levels mentioned above. The vehicle electrical system 316 may be configured to transfer direct current.

With reference to FIG. 20, the vehicle electrical system 316 may be electrically connected, or connectable, to one or more electrical battery arrangements 306 and/or 2 one or more electric battery packs 310. It may be defined that the electrical battery arrangement 306 and/or the electric battery pack 310 is/are configured for high voltage, for example for one or more of the voltages levels mentioned above. The vehicle electrical system 316 may be configured to electrically connect the electrical battery arrangement 306 and/or the electric battery pack 310 to the powertrain 304 of the vehicle 300. The vehicle electrical system 316 may be configured to electrically connect the electrical battery arrangement 306 and/or the electric battery pack 310 to the one or more electric motors 104 of the vehicle 300. It may be defined that the vehicle electrical system 316 is configured to transfer the electric power, or the electric current, for example between the one or more electric motors 104 (and/or the powertrain 304) and the electrical battery arrangement 306 and/or the electric battery pack 310.

It is to be understood that embodiments of the electric rotating machine 100 and the method may be applied to configurations, structures, or apparatuses different from a vehicle 300.

The present invention is not limited to the above-described embodiments. Instead, the present invention relates to, and encompasses all different embodiments being included within the scope of the independent claims.

The invention claimed is:

1. An electric rotating machine comprising:

a stator;

a rotor rotatable about an axis of rotation in relation to the stator;

a rotor compartment holding the rotor;

a fluid system for cooling the stator; and a fluid-guiding member having a front and a back, wherein the fluid-guiding member comprises a guide for guiding a fluid, wherein the guide extends from the front of the fluid-guiding member toward the back of the fluid-guiding member, wherein the guide is immovable in relation to the stator, and wherein the guide is configured to guide a fluid from the front of the fluid-guiding member via a peripheral opening to the back of the fluid-guiding member upon rotation of the rotor to remove a fluid from the rotor compartment.

2. An electric rotating machine according to claim 1, wherein the electric rotating machine comprises a gable unit immovable in relation to the stator, wherein the back of the fluid-guiding member faces the gable unit, and wherein the front of the fluid-guiding member faces away from the gable unit.

3. An electric rotating machine according to claim 2, wherein a drain space is formed between the gable unit and the back of the fluid-guiding member, and wherein the drain space is configured to drain a fluid away from the guide.

4. An electric rotating machine according to claim 2, wherein the fluid-guiding member is located between the gable unit and the rotor.

5. An electric rotating machine according to claim 1, wherein the guide extends from the front of the fluid-guiding member to the back of the fluid-guiding member.

6. An electric rotating machine according to claim 1, wherein the guide comprises one or more sloping surfaces for guiding a fluid.

7. An electric rotating machine according to claim 6, wherein the guide is configured to guide a fluid from the front of the fluid-guiding member to the back of the fluid-guiding member on the one or more sloping surfaces upon rotation of the rotor to remove a fluid from the rotor compartment.

8. An electric rotating machine according to claim 6, wherein one or more of the one or more sloping surfaces is/are concave.

9. An electric rotating machine according to claim 6, wherein the guide comprises two opposing sloping surfaces.

10. An electric rotating machine according to claim 9, wherein the guide comprises an apex pointing in a direction toward the back of the fluid-guiding member, and wherein the two opposing sloping surfaces are joined in the apex.

11. An electric rotating machine according to claim 9, wherein the fluid-guiding member has a periphery surrounding the axis of rotation, and wherein the guide adjoins the periphery of the fluid-guiding member at the front of the fluid-guiding member.

12. An electric rotating machine according to claim 11, wherein the peripheral opening is formed in the fluid-guiding member between the front of the fluid-guiding member and the back of the fluid-guiding member, and wherein the guide enters the peripheral opening.

13. An electric rotating machine according to claim 11, wherein the periphery of the fluid-guiding member is annular.

14. An electric rotating machine according to claim 11, wherein the periphery of the fluid-guiding member comprises a peripheral path at the front of the fluid-guiding member, and wherein the peripheral path is configured to guide a fluid upon rotation of the rotor.

15. An electric rotating machine according to claim 14, wherein the guide adjoins the peripheral path.

16. An electric rotating machine according to claim 11, wherein the periphery of the fluid-guiding member comprises a wall at the front of the fluid-guiding member, wherein the wall comprises an inner surface facing the axis of the rotation, and wherein the inner surface of the wall is configured to receive a fluid upon rotation of the rotor.

17. An electric rotating machine according to claim 11, wherein the guide comprises one or more ramps, and wherein at the front of the fluid-guiding member the periphery of the fluid-guiding member and each one of one or more of the one or more sloping surfaces are joined via the one or more ramps.

18. An electric rotating machine according to claim 17, wherein the ramp is configured to guide a fluid from the periphery of the fluid-guiding member at the front of the fluid-guiding member to one of the one or more sloping surfaces upon rotation of the rotor.

19. An electric rotating machine according to claim 1, wherein the guide comprises one or more sloping surfaces for guiding a fluid, wherein the one or more sloping surfaces extends from the front of the fluid-guiding member toward the back of the fluid-guiding member.

20. An electric rotating machine according to claim 19, wherein the ramp is configured to guide a fluid from the periphery of the fluid-guiding member at the front of the fluid-guiding member to one of the one or more sloping surfaces upon rotation of the rotor.

21. A method for removing a fluid from a rotor compartment holding a rotor of an electric rotating machine having a stator, wherein the fluid originates from a fluid system for cooling one or more of the rotor and stator, wherein the electric rotating machine comprises:

the stator;

the rotor rotatable about an axis of rotation in relation to the stator;

the rotor compartment;

the fluid system for cooling the stator; and a fluid-guiding member having a front and a back, wherein the fluid-guiding member comprises a guide for guiding a fluid, and wherein the guide extends from the front of the fluid-guiding member toward the back of the fluid-guiding member, wherein the guide is immovable in relation to the stator, and wherein the method comprises:

guiding a fluid from the front of the fluid-guiding member via a peripheral opening to the back of the fluid-guiding member by way of the guide and upon rotation of the rotor to remove a fluid from the rotor compartment.

22. A vehicle comprising one or more electric rotating machines, wherein said one or more electric machines comprises a stator;

a rotor rotatable about an axis of rotation in relation to the stator;

a rotor compartment holding the rotor;

a fluid system for cooling the stator; and a fluid-guiding member having a front and a back, wherein the fluid-guiding member comprises a guide for guiding a fluid, wherein the guide extends from the front of the fluid-guiding member toward the back of the fluid-guiding member, wherein the guide is immovable in relation to the stator, and wherein the guide is configured to guide a fluid from the front of the fluid-guiding member via a peripheral opening to the back of the fluid-guiding member upon rotation of the rotor to remove a fluid from the rotor compartment.

23. An electric rotating machine comprising:

a stator;

a rotor rotatable about an axis of rotation in relation to the stator;

a rotor compartment holding the rotor;

a fluid system for cooling one or more of the rotor and stator; and a fluid-guiding member having a front and a back, wherein the front of the fluid-guiding member faces the rotor compartment while the back of the fluid-guiding member faces away from the rotor compartment, wherein the fluid-guiding member has a periphery surrounding the axis of rotation, wherein the fluid-guiding member comprises a guide for guiding a fluid, wherein the guide extends from the front of the fluid-guiding member toward the back of the fluid-guiding member, wherein the guide is configured to guide a fluid from the front of the fluid-guiding member to the back of the fluid-guiding member upon rotation of the rotor to remove a fluid from the rotor compartment, wherein the guide comprises two opposing sloping surfaces for guiding a fluid, wherein the guide adjoins the periphery of the fluid-guiding member at the front of the fluid-guiding member, wherein the guide comprises one or more ramps, and wherein at the front of the fluid-guiding member the periphery of the fluid-guiding member and each one of one or more of the one or more sloping surfaces are joined via the one or more ramps.

\* \* \* \* \*